US010875218B2

(12) United States Patent
Mello

(10) Patent No.: US 10,875,218 B2
(45) Date of Patent: *Dec. 29, 2020

(54) METHOD AND APPARATUS FOR MANUFACTURING BUILDING PANELS

(71) Applicant: Bryan Scott Mello, Cincinnati, OH (US)

(72) Inventor: Bryan Scott Mello, Cincinnati, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/329,907

(22) PCT Filed: Sep. 1, 2017

(86) PCT No.: PCT/US2017/049813
§ 371 (c)(1),
(2) Date: Mar. 1, 2019

(87) PCT Pub. No.: WO2018/045264
PCT Pub. Date: Mar. 8, 2018

(65) Prior Publication Data
US 2019/0202094 A1    Jul. 4, 2019

Related U.S. Application Data

(63) Continuation-in-part of application No. 15/254,843, filed on Sep. 1, 2016, now Pat. No. 9,732,525.

(51) Int. Cl.
*E04B 1/74* (2006.01)
*B29C 44/42* (2006.01)
(Continued)

(52) U.S. Cl.
CPC .......... *B29C 44/424* (2013.01); *B29C 44/128* (2013.01); *B29C 44/1228* (2013.01);
(Continued)

(58) Field of Classification Search
CPC ...... E04C 2/386; E04B 1/7604; E04B 1/7608; E04B 7/22; E04B 2/54; E04B 5/26;
(Continued)

(56) References Cited

U.S. PATENT DOCUMENTS 3,259,175 A    7/1966 Kraus et al.
3,641,724 A    2/1972 Palmer
(Continued)

FOREIGN PATENT DOCUMENTS

CA    2660456    2/2007
WO    1990001598    2/1990
(Continued)

OTHER PUBLICATIONS

Barricade Building Products, Division of Specialty Coating and Laminating, LLC; ICC-ES Report (ESR-1197); R-Wrap® Protective House Wrap, Barricade® Building Wrap, Marvelguard® House Wrap, Barricade Plus® Protective House Wrap and Water-Resistive Barriers; Copyright® 2016 ICC Evaluation Service, LLC; pp. 1-4.
(Continued)

*Primary Examiner* — Chi Q Nguyen
(74) *Attorney, Agent, or Firm* — Daniel F. Nesbitt; Hasse & Nesbitt LLC

(57) ABSTRACT

A method of manufacturing building panels includes assembling a frame of a building panel. The frame defines at least one cavity and at least one injection aperture in fluid communication with the at least one cavity. The method also includes positioning the frame on one of a base and a shelf of a multi-panel consolidation device having a plurality of shelves, with the shelves being in an expanded configuration, and at least substantially enclosing the at least one cavity. The method also includes forcing the shelves of the multi-panel consolidation device into a collapsed configuration, and injecting an expandable polymer through the at
(Continued)

least one injection aperture into the at least one cavity. The method further includes forcing the shelves into an expanded configuration after a predetermined period of time selected to permit the expandable polymer to form a foam bonded to the frame.

17 Claims, 23 Drawing Sheets

(51) Int. Cl.
| | | |
|---|---|---|
| B29C 44/12 | (2006.01) | |
| B32B 5/24 | (2006.01) | |
| B29C 44/14 | (2006.01) | |
| E04C 2/38 | (2006.01) | |
| B29C 44/58 | (2006.01) | |
| B29L 31/10 | (2006.01) | |
| B29K 75/00 | (2006.01) | |
| E04B 1/80 | (2006.01) | |
| E04C 2/20 | (2006.01) | |

(52) U.S. Cl.
CPC ............. *B29C 44/14* (2013.01); *B29C 44/58* (2013.01); *B32B 5/245* (2013.01); *E04B 1/74* (2013.01); *E04C 2/38* (2013.01); *B29K 2075/00* (2013.01); *B29L 2031/10* (2013.01); *E04B 1/80* (2013.01); *E04C 2/205* (2013.01)

(58) Field of Classification Search
CPC ....... E04H 9/10; B29C 44/186; B29C 44/187; E04F 21/085; Y10T 428/233; D06N 3/14; D06N 7/0002
USPC ..... 52/745.16, 741.13, 745.06, 309.4, 742.1, 52/784.15, 309.1, 784.14, 309.14, 309.15, 52/309.13, 483.1, 475.1, 508, 506.01; 156/71
See application file for complete search history.

(56) References Cited

U.S. PATENT DOCUMENTS

| | | | |
|---|---|---|---|
| 3,697,633 A | | 10/1972 | Edgar |
| 3,885,008 A | | 5/1975 | Martin |
| 4,185,437 A | | 1/1980 | Robinson |
| 4,246,214 A | | 1/1981 | Osswald et al. |
| 4,259,028 A | * | 3/1981 | Cook ............... E02D 17/08 156/79 |
| 4,260,569 A | | 4/1981 | Hurst |
| 4,345,888 A | | 8/1982 | Brunemann |
| 4,649,682 A | | 3/1987 | Barrett, Jr. |
| 4,937,993 A | | 7/1990 | Hitchens |
| 5,389,167 A | * | 2/1995 | Sperber ............... B05B 7/0025 156/71 |
| 5,509,242 A | | 4/1996 | Rechsteiner et al. |
| 5,606,841 A | | 3/1997 | Carter, Jr. |
| 5,758,463 A | | 6/1998 | Mancini, Jr. |
| 5,765,330 A | | 6/1998 | Richard |
| 6,196,830 B1 | | 3/2001 | Foltuz et al. |
| 6,279,289 B1 | | 8/2001 | Soder et al. |
| 6,332,304 B1 | | 12/2001 | Fuhrman |
| 6,363,674 B1 | | 4/2002 | Carver |
| 6,824,851 B1 | | 11/2004 | Locher et al. |
| 6,846,445 B2 | | 1/2005 | Kim et al. |
| 7,028,440 B2 | | 4/2006 | Brisson |
| 7,127,856 B2 | | 10/2006 | Hagen, Jr. et al. |
| 7,168,216 B2 | | 1/2007 | Hagen, Jr. |
| 7,343,715 B2 | | 3/2008 | Ito et al. |
| 7,574,837 B2 | | 8/2009 | Hagen, Jr. et al. |
| 7,621,101 B2 | | 11/2009 | Solomon et al. |
| 7,836,663 B2 | | 11/2010 | Solomon et al. |
| 8,179,257 B2 | | 5/2012 | Allen, Jr. et al. |
| 8,453,404 B2 | | 6/2013 | Cox |
| 8,567,153 B1 | | 10/2013 | Francavilla |
| 8,925,270 B2 | | 1/2015 | Grisolia et al. |
| 8,966,845 B1 | | 3/2015 | Ciuperca |
| 9,574,347 B2 | | 2/2017 | Thiercelin |
| 9,732,525 B1 | | 8/2017 | Mello |
| 10,500,772 B2 | * | 12/2019 | Mello ............. E04C 2/46 |
| 2004/0261356 A1 | | 12/2004 | Wrass |
| 2005/0055973 A1 | | 3/2005 | Hagen, Jr. et al. |
| 2005/0188649 A1 | | 9/2005 | Hagen, Jr. |
| 2005/0204697 A1 | | 9/2005 | Rue |
| 2006/0260267 A1 | | 11/2006 | Hagen et al. |
| 2007/0039262 A1 | | 2/2007 | Forgy |
| 2007/0163197 A1 | | 7/2007 | Payne et al. |
| 2008/0086978 A1 | | 4/2008 | Gilgan et al. |
| 2008/0168741 A1 | | 7/2008 | Gilgan et al. |
| 2008/0276568 A1 | | 11/2008 | Adams et al. |
| 2009/0178354 A1 | | 7/2009 | Solomon et al. |
| 2009/0216503 A1 | | 8/2009 | Ossmann |
| 2009/0293396 A1 | | 12/2009 | Porter |
| 2009/0301022 A1 | * | 12/2009 | Rockwell ............... D21H 21/18 52/588.1 |
| 2011/0047908 A1 | | 3/2011 | Brusman et al. |
| 2011/0302877 A1 | | 12/2011 | Gilgan et al. |
| 2012/0291384 A1 | * | 11/2012 | Martens ............... E04C 2/386 52/309.1 |
| 2013/0037984 A1 | | 2/2013 | Arnauts |
| 2013/0224434 A1 | | 8/2013 | Hatanaka et al. |
| 2013/0224438 A1 | | 8/2013 | Matsuyama et al. |
| 2013/0318911 A1 | | 12/2013 | Sealock et al. |
| 2014/0115989 A1 | | 5/2014 | Sievers et al. |
| 2014/0311076 A1 | * | 10/2014 | Ishaque ............... E04F 13/0876 52/404.2 |
| 2015/0107175 A1 | * | 4/2015 | Frazier ............... B27F 1/00 52/309.1 |
| 2015/0376898 A1 | * | 12/2015 | Kreizinger ............... E04C 2/284 52/483.1 |
| 2016/0194864 A1 | * | 7/2016 | Walker ............... E04B 7/205 52/745.06 |
| 2017/0306624 A1 | | 10/2017 | Graham et al. |

FOREIGN PATENT DOCUMENTS

| | | |
|---|---|---|
| WO | 2007021497 | 2/2007 |
| WO | 2007021867 | 2/2007 |

OTHER PUBLICATIONS

3M™; 2-Component Spray Polyurethane Foam Insulance SFI-175; Jul. 2013, 3M is a trademark of 3M Company Copyright® 2013; pp. 1-3.
3M® Refillable Spray Foam Insulation System; 3M SFI-175 Product & Equipment Options; 3M is a trademark of 3M Copyright® 2013; pp. 1-2.
International Search Report and Written Opinion dated Nov. 15, 2017 by Russian Patent Office as ISA, for corresponding International Application No. PCT/US2017/049813 filed Sep. 1, 2017 (7 pages).
International Preliminary Report on Patentability (Chapter I) dated Mar. 5, 2019, for corresponding International Application No. PCT/US2017/049813 filed Sep. 1, 2017 (5 pages).
Non-final Office Action dated Mar. 28, 2019 in co-pending U.S. Appl. No. 15/644,194, filed Jul. 7, 2017 (9 pages).
U.S. Appl. No. 15/644,194, filed Jul. 7, 2017, Mello.

* cited by examiner

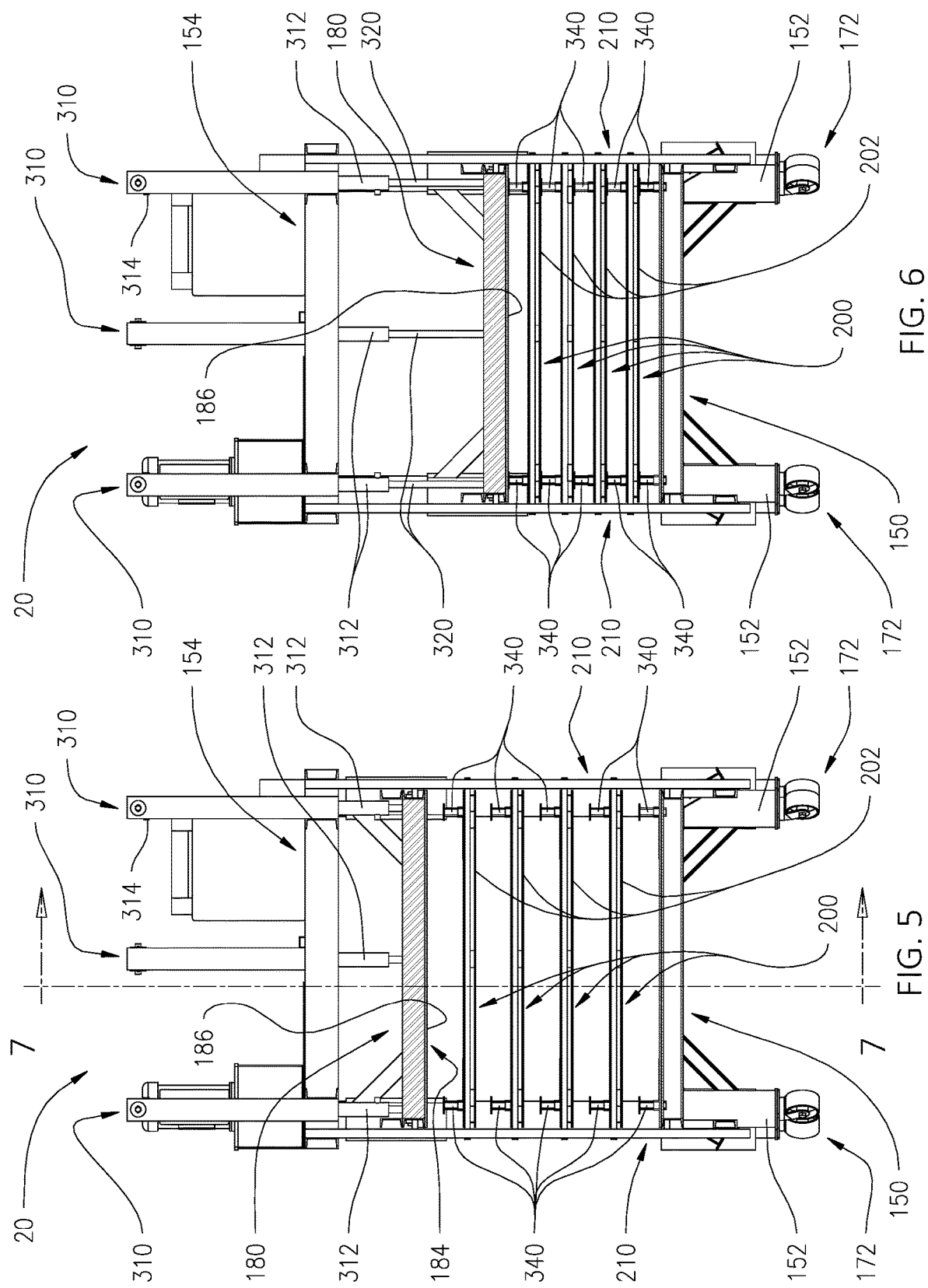

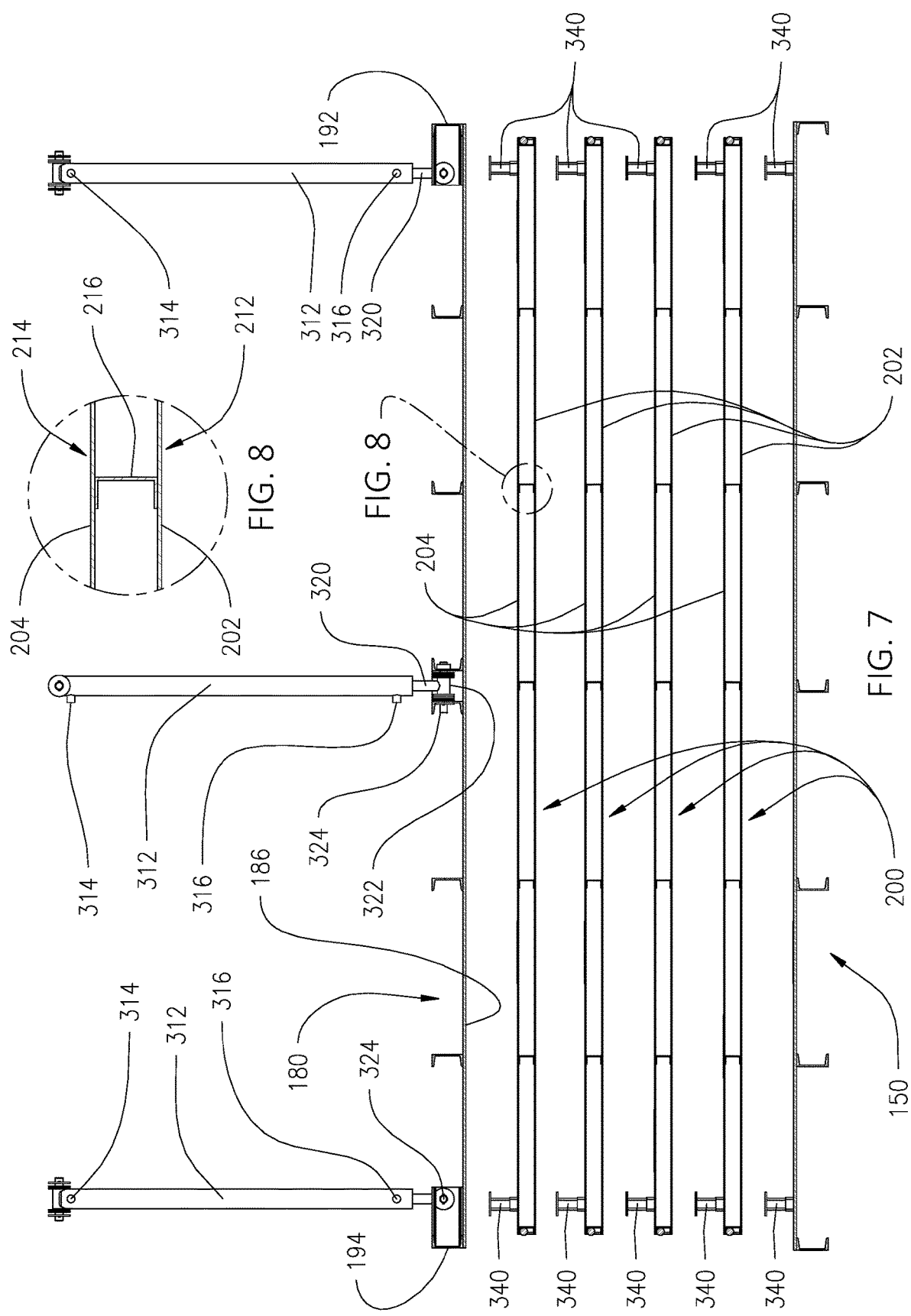

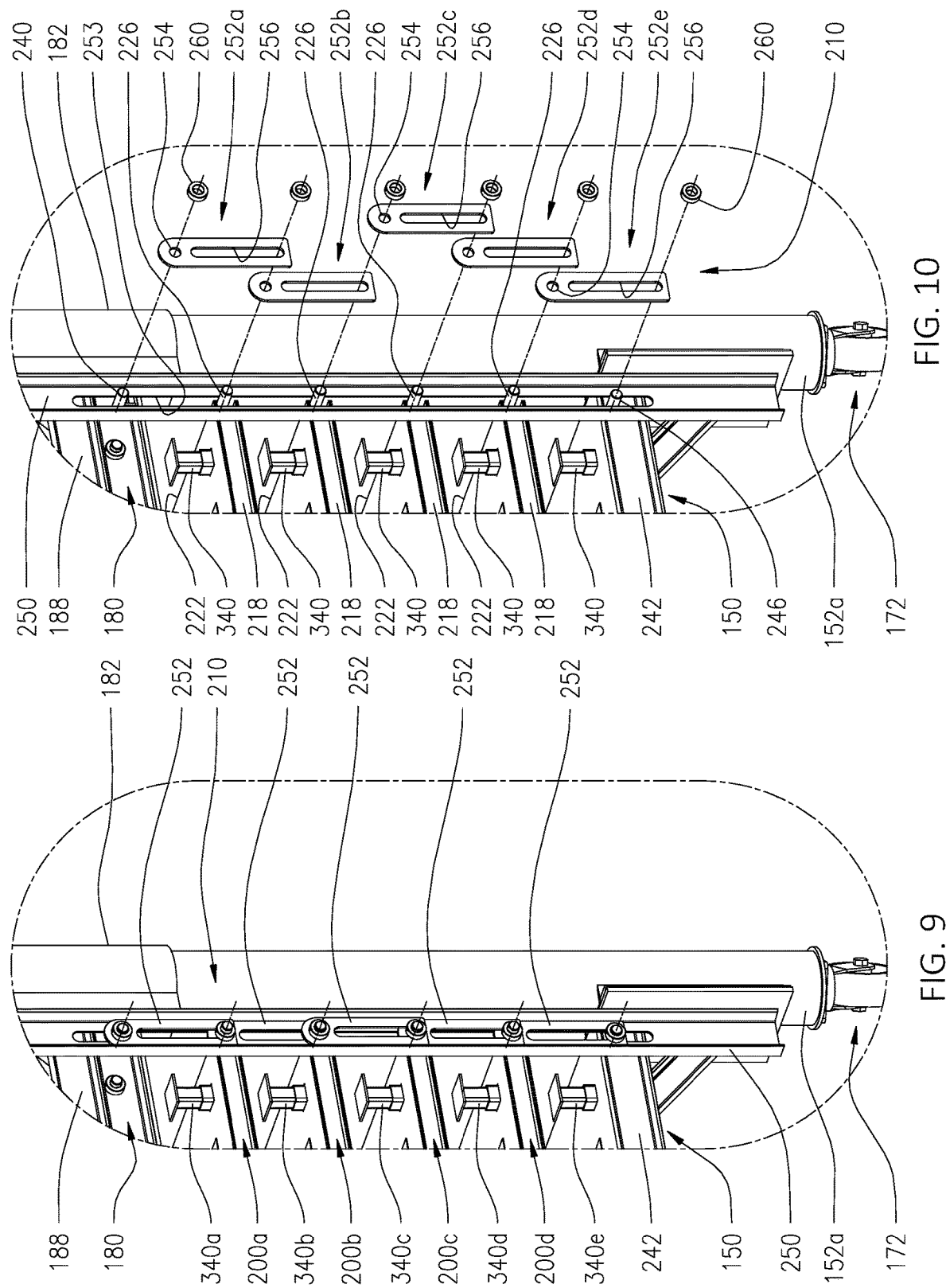

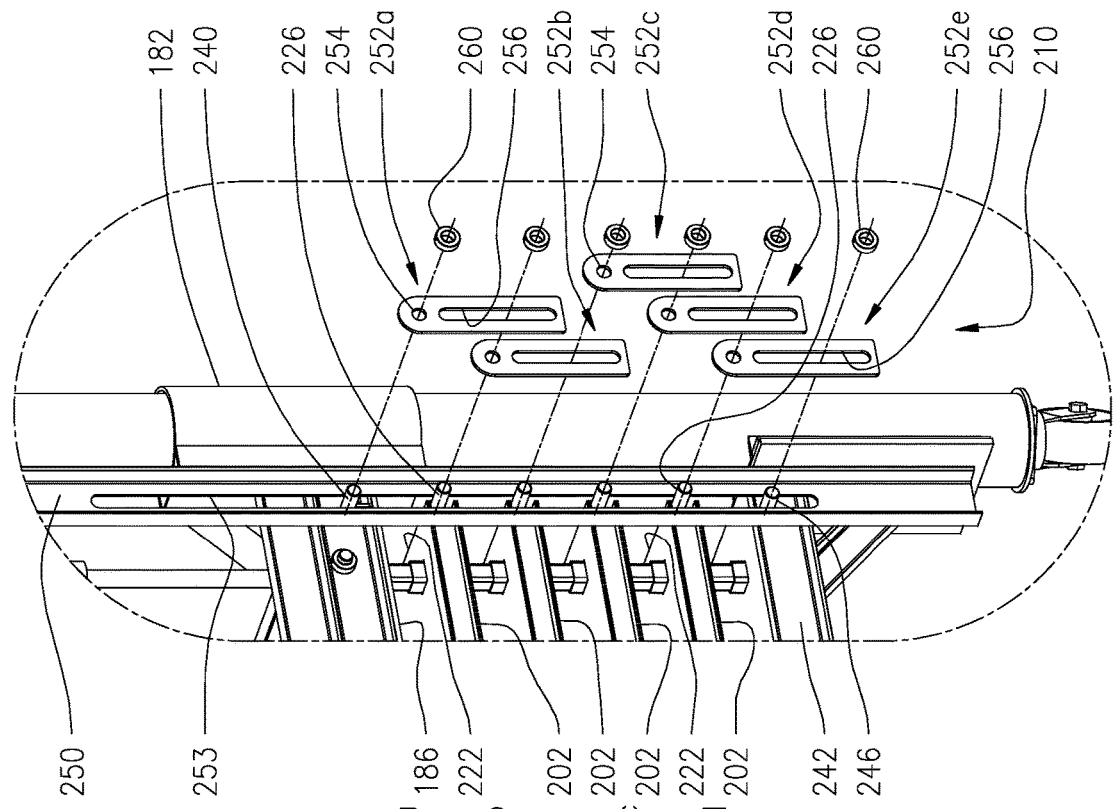
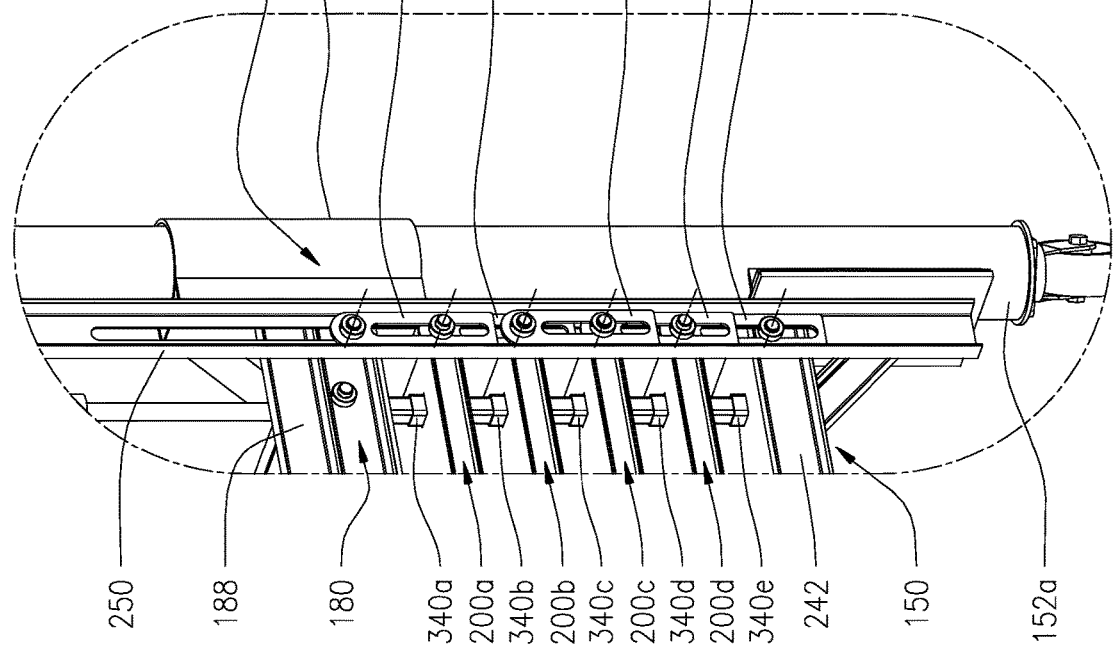

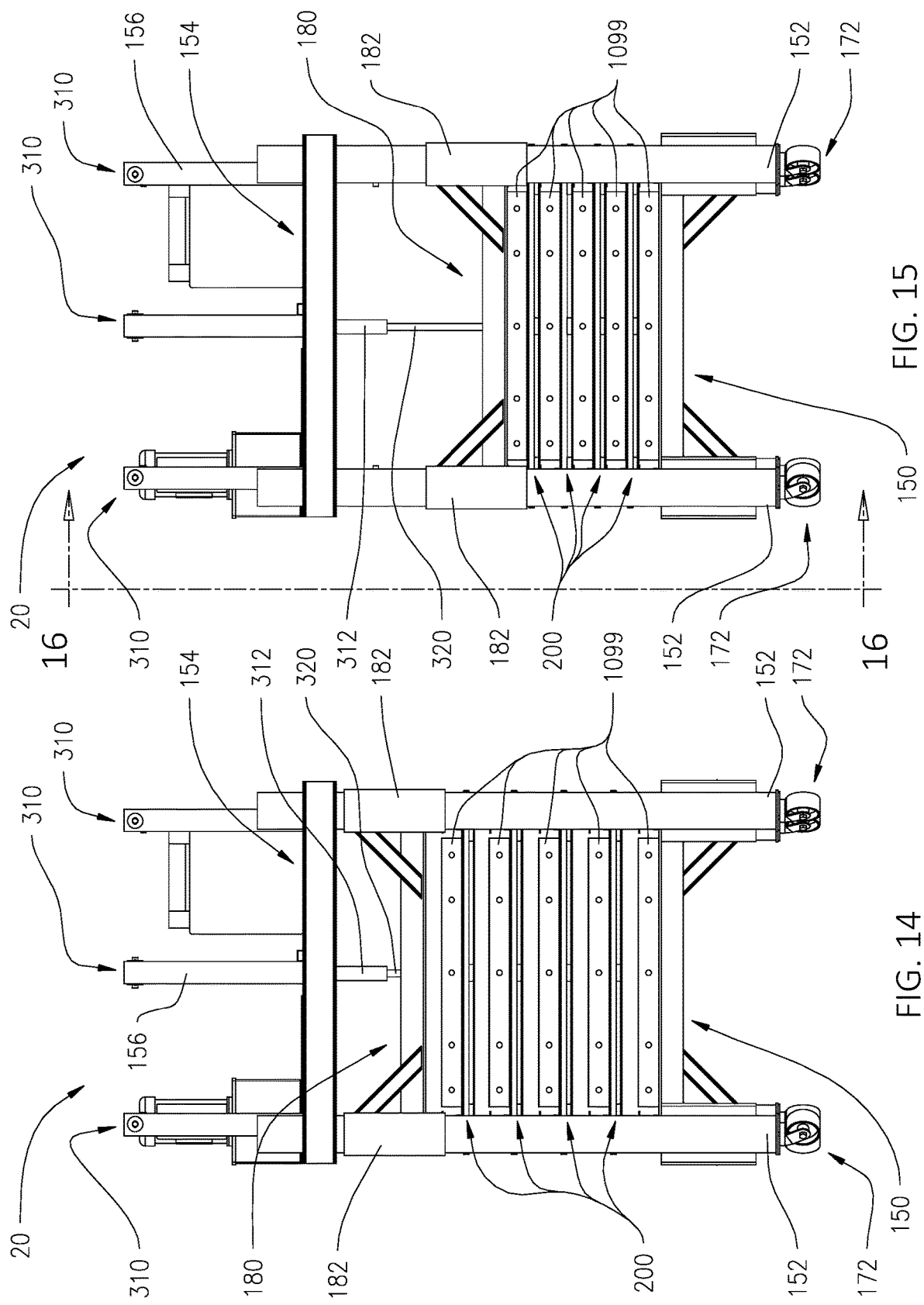

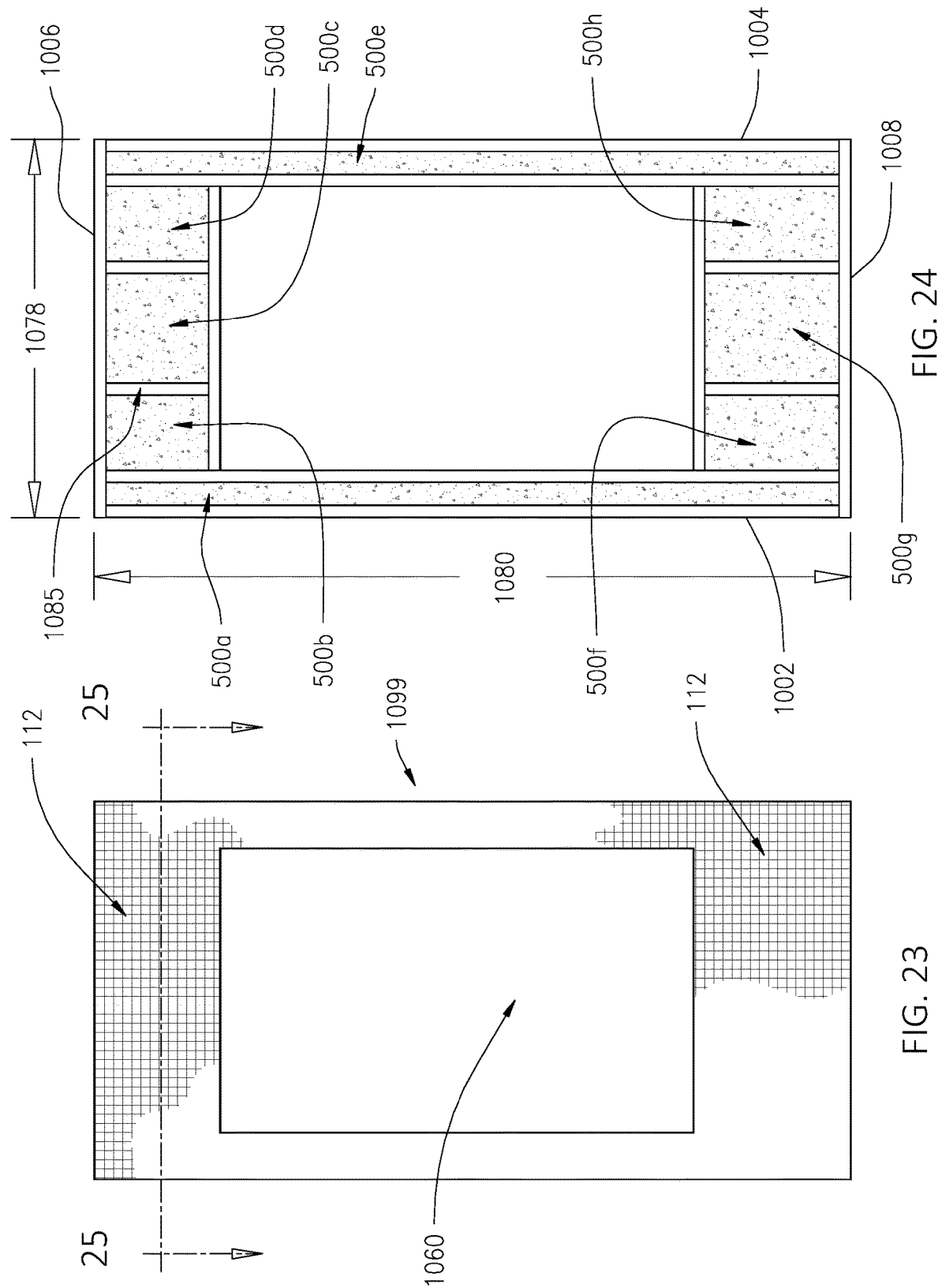

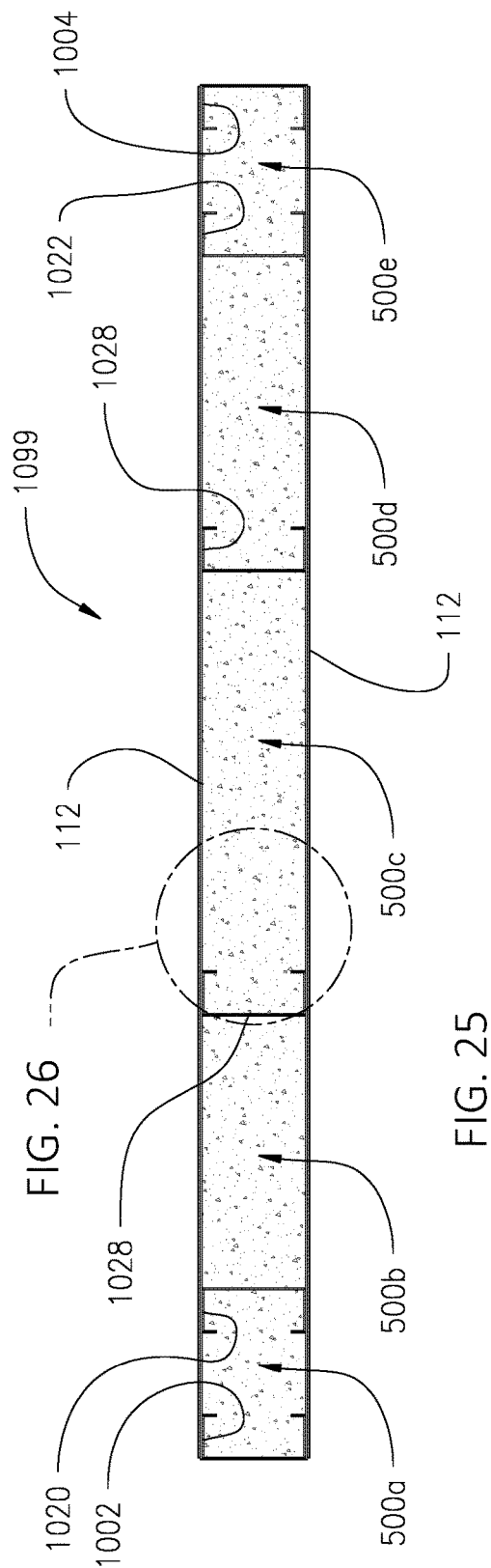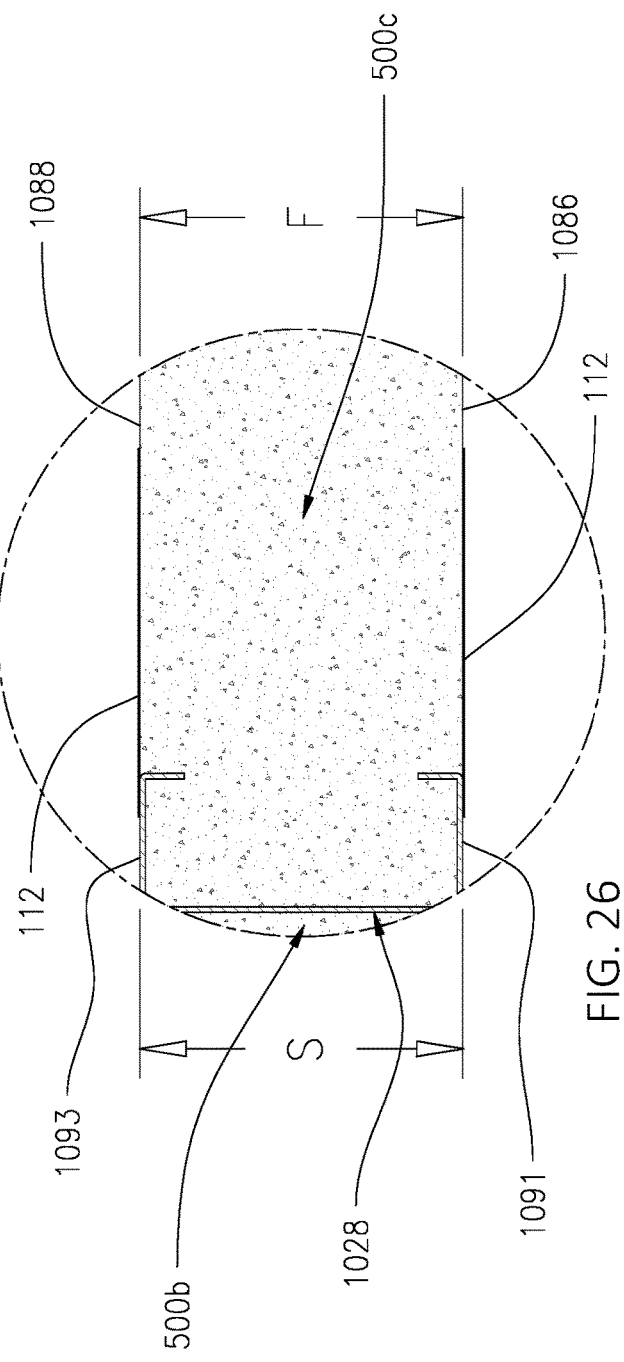

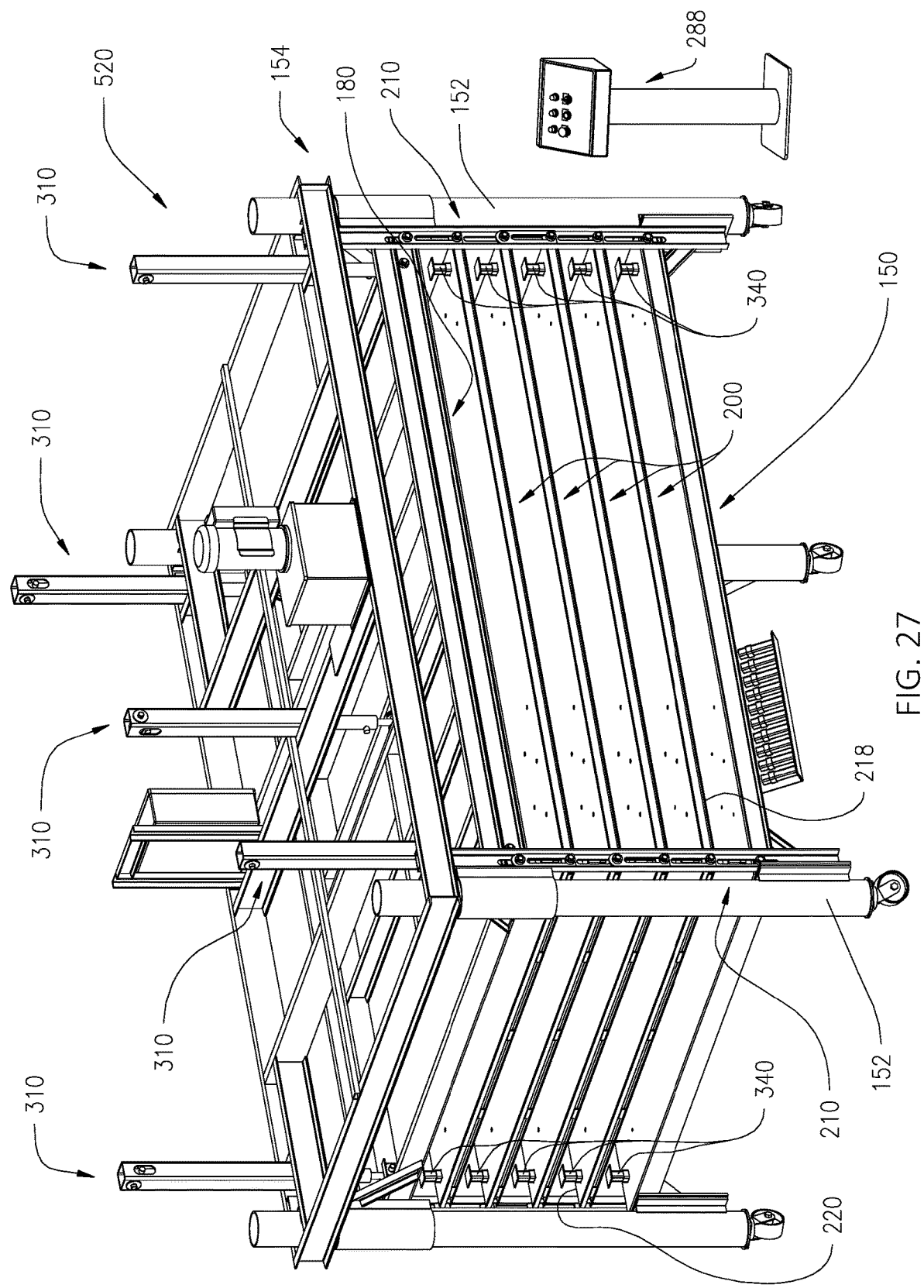

METHOD AND APPARATUS FOR MANUFACTURING BUILDING PANELS

CROSS REFERENCE TO RELATED APPLICATIONS

This application is a 371 of International Application No. PCT/US2017/049813 filed Sep. 1, 2017, which is a continuation-in-part of U.S. Non-provisional application Ser. No. 15/254,483 filed Sep. 1, 2016, now U.S. Pat. No. 9,732,525 issued Aug. 15, 2017, the disclosure of which is disclosed herein by reference in its entirety.

TECHNICAL FIELD

This application relates generally to the manufacture of panels, and more particularly, to a method and apparatus for manufacturing building panels.

BACKGROUND

Building panels are known that include a peripheral frame and a foam that is formed at least within the peripheral frame and is bonded to the frame. The peripheral frame includes top and bottom horizontal stud members, and left and right vertical stud members, which are connected to each of the top and bottom horizontal stud members. The materials of construction for the stud members include metal, wood and plastic. Known materials for the foam include thermoplastic and thermoset materials. Known building panels of this type include those having a fiber reinforced layer applied to an exterior surface of the building panel.

SUMMARY OF THE INVENTION

An embodiment of the invention provides a method of manufacturing a building panel that includes a frame having at least one cavity, comprising the steps of positioning the frame on one of a base and a shelf of a multi-panel consolidation device, which includes a plurality of shelves, with the shelves being in an expanded configuration; forcing the shelves of the multi-panel consolidation device into a collapsed configuration; injecting an expandable polymer through at least one injection aperture in the frame into the at least one cavity; forcing the shelves of the multi-panel consolidation device into an expanded configuration after a predetermined period of time selected to permit the expandable polymer to form a stable expanded foam within the at least one cavity and bonded to the frame; wherein the forcing the shelves of the multi-panel consolidation device into the collapsed configuration includes applying a compressive force to the frame and constraining expansion of the expandable polymer.

Another embodiment of the invention provides a method for making a foam-filled building panel. a frame is provided having a periphery that includes a front peripheral frame surface and a rear peripheral frame surface, where the frame defines a cavity, the front frame surface defining a front opening and the rear frame surface defining a rear opening. The frame has a thickness defined between the front peripheral frame surface and the rear peripheral frame surface. a top planar shelf is provided having a lower surface, and a bottom planar shelf having an upper surface. Also provided are a plurality of spacers, each having an upper surface and a lower surface, and a height defined between the upper surface and the lower surface. The lower surfaces of the plurality of spacers are placed against the upper surface of the bottom planar shelf at spaced-apart positions, where the heights of the plurality of spacers are the same as the thickness of the frame. The method includes the step of placing the lower surface of the top planar shelf over and in contact with the front peripheral frame surface to close completely the front opening, and the upper surface of the bottom planar shelf over and in contact with the rear peripheral frame surface to close completely the rear frame opening. The method also includes the step of applying a first force against the top planar shelf and a second force against the bottom planar shelf. The method also includes the step of injecting an amount of an expandable polymer through an aperture in the frame into the cavity, and closing the aperture. The method further includes the step of maintaining the applied forces for a time sufficient for the expandable polymer to expand and fill the cavity, and to form a stable expanded foam. The method also includes the step of releasing the first and second forces and removing the top and bottom planar shelves from the front and rear frame surfaces to form the foam-filled building panel. In the method, the applied first force and applied second force are sufficient to maintain the top and bottom planar shelves in contact with the front peripheral frame surface and the rear peripheral frame surface of the frame while the expandable polymer is expanding and filling the cavity, and the top planar shelf and the bottom planar shelf have a rigidity sufficient to maintain planarity against the applied first and second forces and an expanding force of the expandable polymer. In the method, the lower surface of the top planar shelf contacts the upper surfaces of the plurality of spacers, whereby the plurality of spacers define a minimum distance between the top planar shelf and the bottom planar shelf during the application of the applied force to limit crushing of the frame beyond such minimum distance.

According to another embodiment, a multi-panel consolidation device includes a base and a plurality of posts attached to the base and extending upwardly from the base. The multi-panel consolidation device also includes an upper structure movably coupled with the posts. The upper structure is movable upwardly and downwardly relative to the posts and the base. The multi-panel consolidation device also includes a plurality of shelves and a plurality of link assemblies. The shelves are vertically spaced and are disposed vertically between the base and the upper structure. Each of the link assemblies is connected to the upper structure and each one of the shelves. The shelves are movable upwardly and downwardly relative to the posts and the base, between an expanded configuration and a collapsed configuration.

According to another embodiment, a multi-panel consolidation device includes a base and a plurality of posts attached to the base. The multi-panel consolidation device also includes an upper structure, a plurality of shelves and a plurality of spacers. The upper structure is movably coupled with the posts, and is movable upwardly and downwardly relative to the base and the posts. The shelves are vertically spaced and disposed vertically between the base and the upper structure. The shelves are connected to the upper structure and are interconnected with one another, and are movable upwardly and downwardly relative to the base and the posts, between an expanded configuration and a collapsed configuration. At least some of the spacers are connected to each of the base, an uppermost one of the shelves, and a lower one of each vertically adjacent pair of the shelves. When the shelves are in the expanded configuration, the spacers connected to the base are vertically spaced from a lowermost one of the shelves, the spacers connected to a lower one of each vertically adjacent pair of the shelves are vertically spaced from an upper one of each vertically adjacent pair of the shelves, and the spacers connected to the uppermost one of the shelves are vertically spaced from the upper structure.

According to another embodiment, a house includes a foundation and a plurality of U-shaped tracks attached to the foundation. The house also includes a structure that includes a plurality of building panels that include a frame having at least one cavity, and an expanded foam within the at least one cavity and bonded to the frame, in accordance with the invention.

According to another embodiment, the expanded foam includes a foam structure that includes a front face, a back face and a peripheral edge, confined on its peripheral edge by the frame. Each of the studs includes a front surface, a rear surface and a thickness S from the front surface to the rear surface. The foam structure has a foam thickness F. The foam thickness F is defined as the thickness S with a tolerance having an absolute value of less than 2 mm (0.079 inches), including less than 1 mm (0.039 inches) and including less than 0.5 mm (0.02 inches).

BRIEF DESCRIPTION OF THE DRAWINGS

FIG. 5 is an elevation view, partially in cross-section, of one end of the multi-panel consolidation device of FIG. 2, taken along line-5 in FIG. 4, with the shelves of the multi-panel consolidation device depicted in the expanded configuration.

FIG. 6 is an elevation view, partially in cross-section, similar to FIG. 5, but with the shelves of the multi-panel consolidation device depicted in the collapsed configuration.

FIG. 7 is a cross-sectional view taken along line 7-7 in FIG. 5, with an upper frame of the multi-panel consolidation device omitted.

FIG. 8 is an enlarged view of an encircled portion of FIG. 7.

FIG. 9 is an enlarged perspective view of an encircled portion of FIG. 2, depicting a portion of a link assembly, and a portion of the shelves, of the multi-panel consolidation device, with the shelves in an expanded configuration.

FIG. 10 is an enlarged perspective view similar to FIG. 9, but with a plurality of the links of the link assembly exploded away from the remainder of the link assembly.

FIG. 11 is an enlarged perspective view of an encircled portion of FIG. 3, depicting the portion of the shelves shown in FIG. 9, but with the shelves of the multi-panel consolidation device depicted in the collapsed configuration.

FIG. 12 is an enlarged perspective view similar to FIG. 11, but with the plurality of the links of the link assembly exploded away from the remainder of the link assembly.

FIG. 14 is an end elevation view depicting five building panels installed in the multi-panel consolidation device of FIG. 2, with the shelves of the multi-panel consolidation device depicted in the expanded configuration.

FIG. 15 is an end elevation view similar to FIG. 13, but with the shelves of the multi-panel consolidation device depicted in the collapsed configuration.

FIG. 23 is a front elevation view of a building panel that includes the frame of FIG. 20, depicting a fabric of the building panel.

FIG. 24 is a front elevation view similar to FIG. 23, but with the fabric not shown, and depicting foam within cavities defined by the frame of the building panel.

FIG. 25 is a cross-sectional view taken along line 25-25 in FIG. 23.

FIG. 26 is an enlarged view of an encircled portion of FIG. 25.

FIG. 27 is a perspective view of a multi-panel consolidation device according to another embodiment.

DETAILED DESCRIPTION OF THE INVENTION

Figure 1:
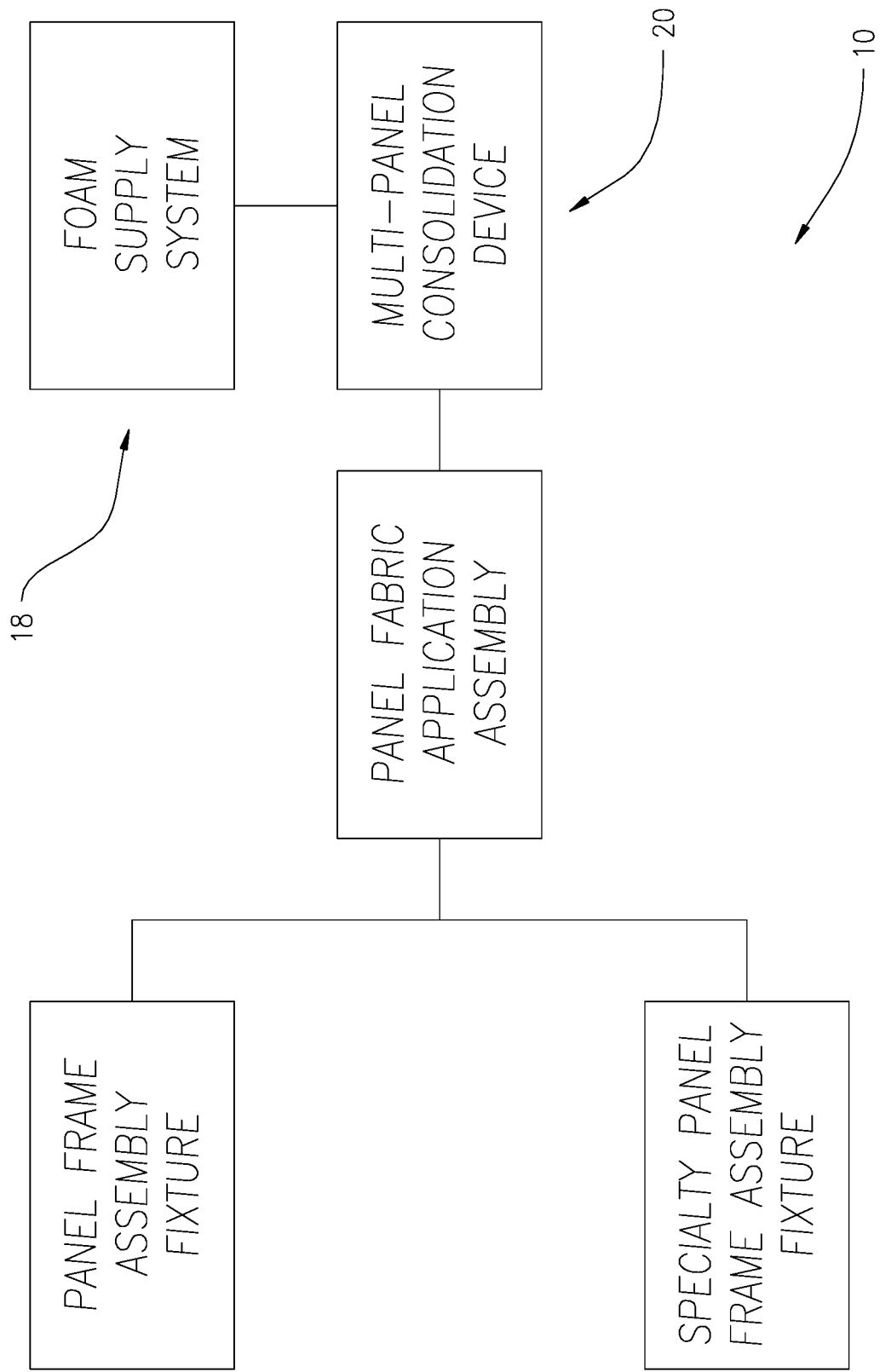
FIG. 1 is a schematic representation of a system for manufacturing building panels, according to one embodiment.
Figure 2:
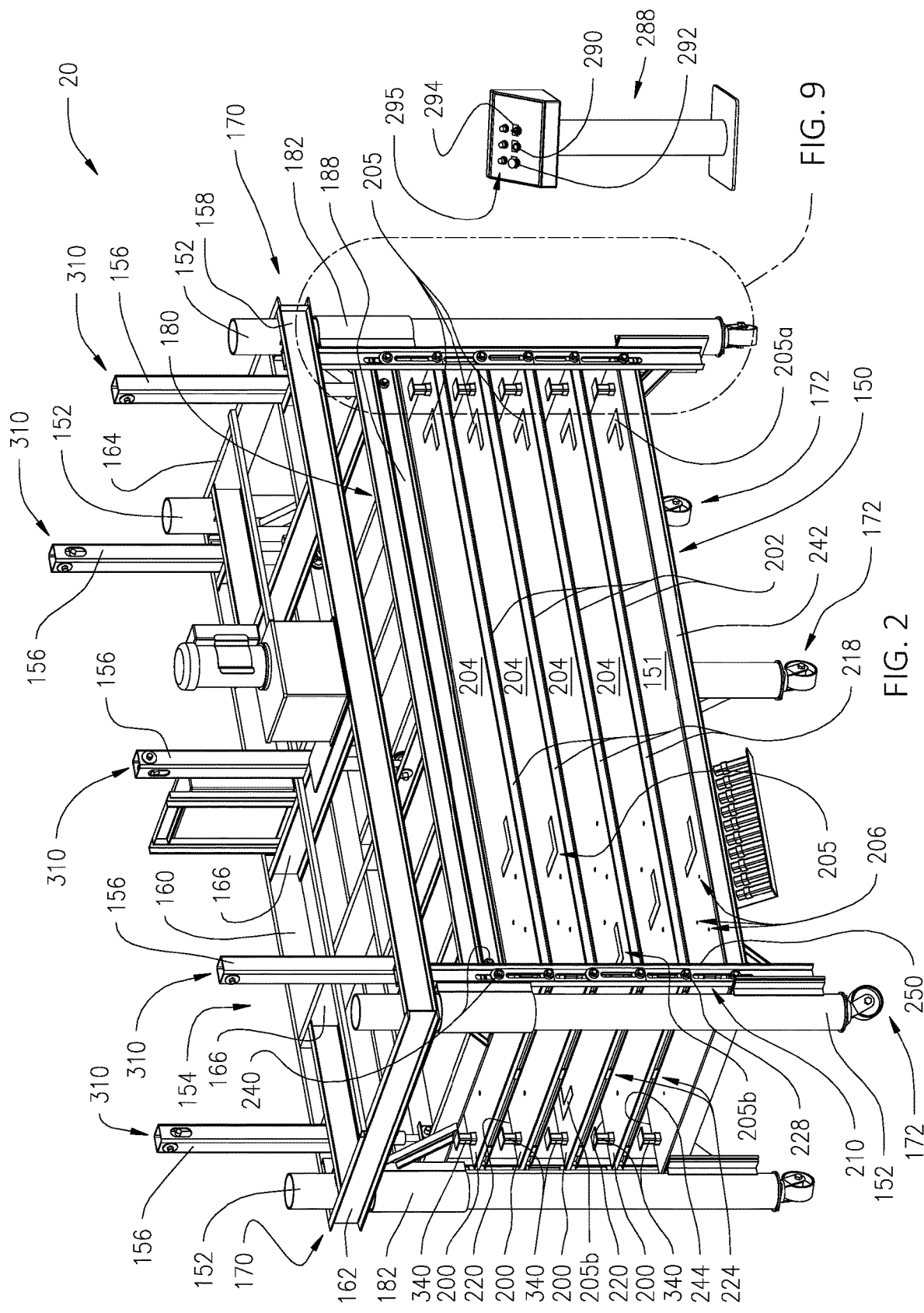
FIG. 2 is a perspective view of a multi-panel consolidation device of the system of FIG. 1, according to one embodiment, with a plurality of shelves of the multi-panel consolidation device depicted in an expanded configuration, and depicting a control console of a hydraulic system of the multi-panel consolidation device.
Figure 18:
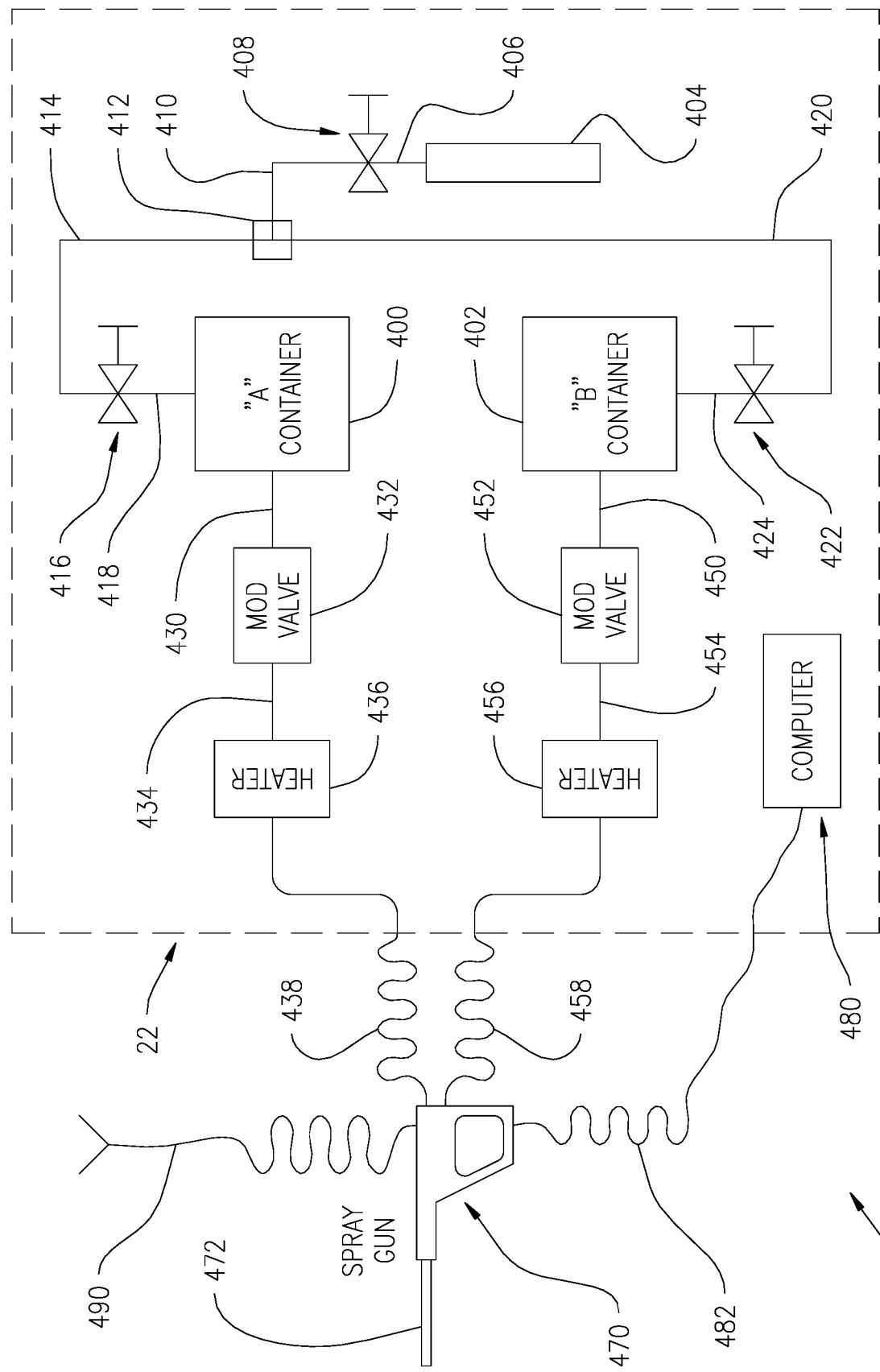
FIG. 18 is a schematic representation of a foam supply system of the system for manufacturing building panels of FIG. 1.

FIG. 1 schematically illustrates a system 10 for manufacturing building panels, according to one embodiment. System 10 can include a panel frame assembly fixture, a specialty panel frame assembly fixture, a panel fabric application assembly, a foam supply system 18 and a multi-panel consolidation device 20. At least a portion of the foam supply system 18 can be disposed in a temperature-controlled room 22 (FIG. 18). Examples of a panel frame assembly fixture, a specialty panel frame assembly fixture, a panel fabric application assembly are described in U.S. Pat. No. 9,732,525.

System 10 can be used to manufacture building panels for use in the construction of residential or commercial structures. Cavities defined by a frame of each building panel can be filled with foam to provide insulation and to enhance the structural integrity of the building panel. In one embodiment, the foam can be made of polyurethane. A thickness of the foam in the panel can determine insulation R-value. The building panels can have a variety of sizes and/or configurations, which can be determined by the particular application in the residential or commercial structure, including, but are not limited to: egress windows; kitchen windows; bathroom windows; door openings including single door openings, and double door openings, for example French doors or sliding doors; double window panels; floor panels; roof panels, gable panels; and panels including one or more electrical conduits and associated electrical circuit apparatus, e.g., a switch housing and/or an electrical outlet housing. The building panels can include a frame, which can include top and bottom exterior members, which can be referred to as top and bottom exterior tracks, respectively, and can include first side and second side exterior members, which can be referred to as first and second side exterior studs, respectively. The top and bottom exterior tracks of the building panels can be horizontal, and the first and second side exterior studs of the building panels can be vertical, when the building panels are installed in a structure. The top and bottom exterior tracks, and the first and second side exterior studs, can be made of metal, or a metal alloy, for example galvanized steel, such that they are fireproof. The top and bottom exterior tracks and the first and second side exterior studs can be attached to one another, for example by welding, such as spot welding, or MIG welding. Alternatively, the top and bottom exterior tracks and the first and second side exterior studs can be attached to one another with an epoxy. The building panels can include additional members, for example, interior members that can be interconnected to one or more of the exterior members, e.g., to both of the top and bottom exterior tracks, to achieve the desired configuration. The interior members can also be made of metal or a metal alloy. In an alternate embodiment, the exterior and interior tracks and studs can be made of a thermoplastic material, and they can be bonded to one another.

Figure 20:
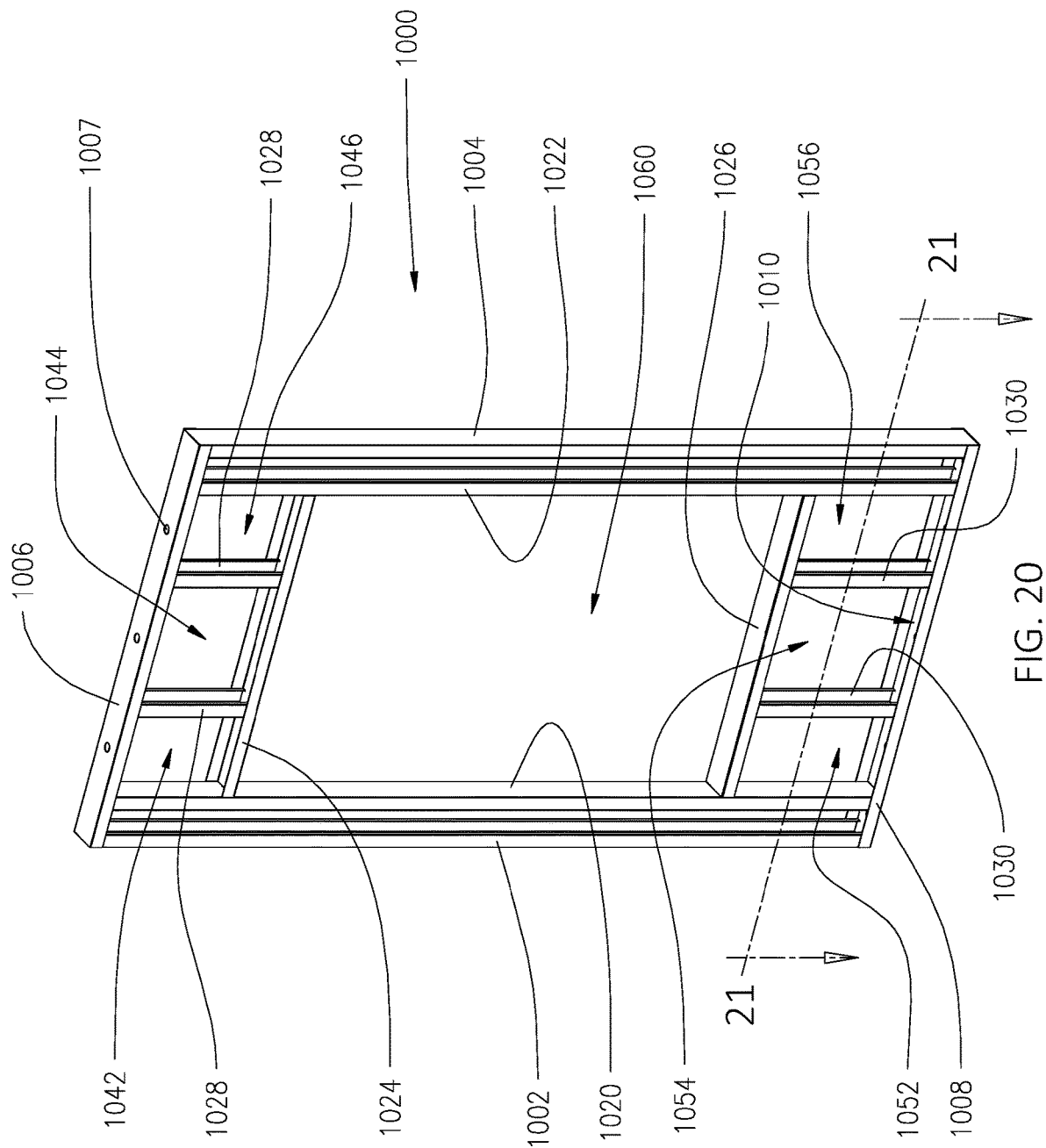
FIG. 20 is a perspective view of a frame of a building panel according to one embodiment.
Figure 21:
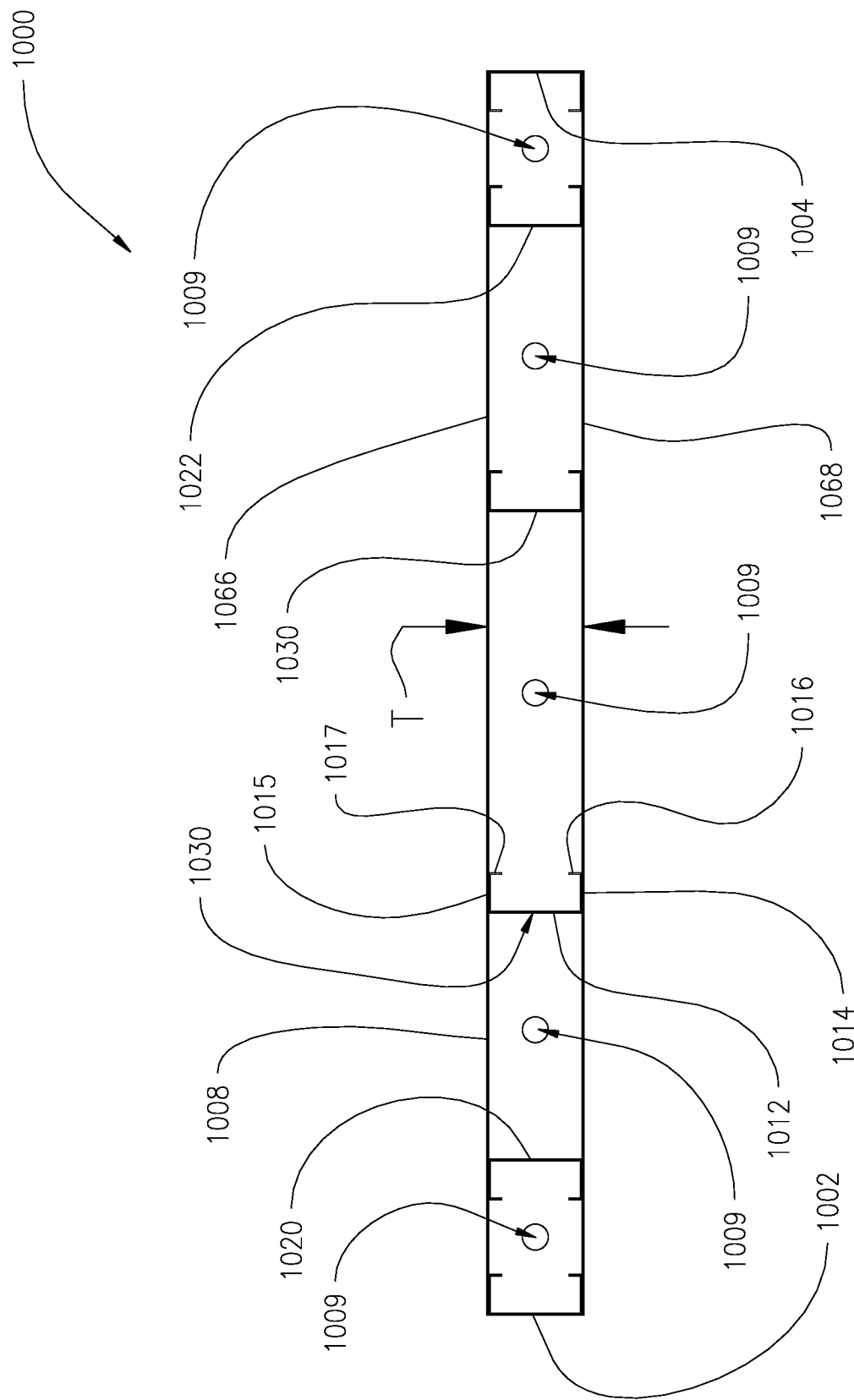
FIG. 21 is a cross-sectional view taken along line 21-21 in FIG. 20.
Figure 22:
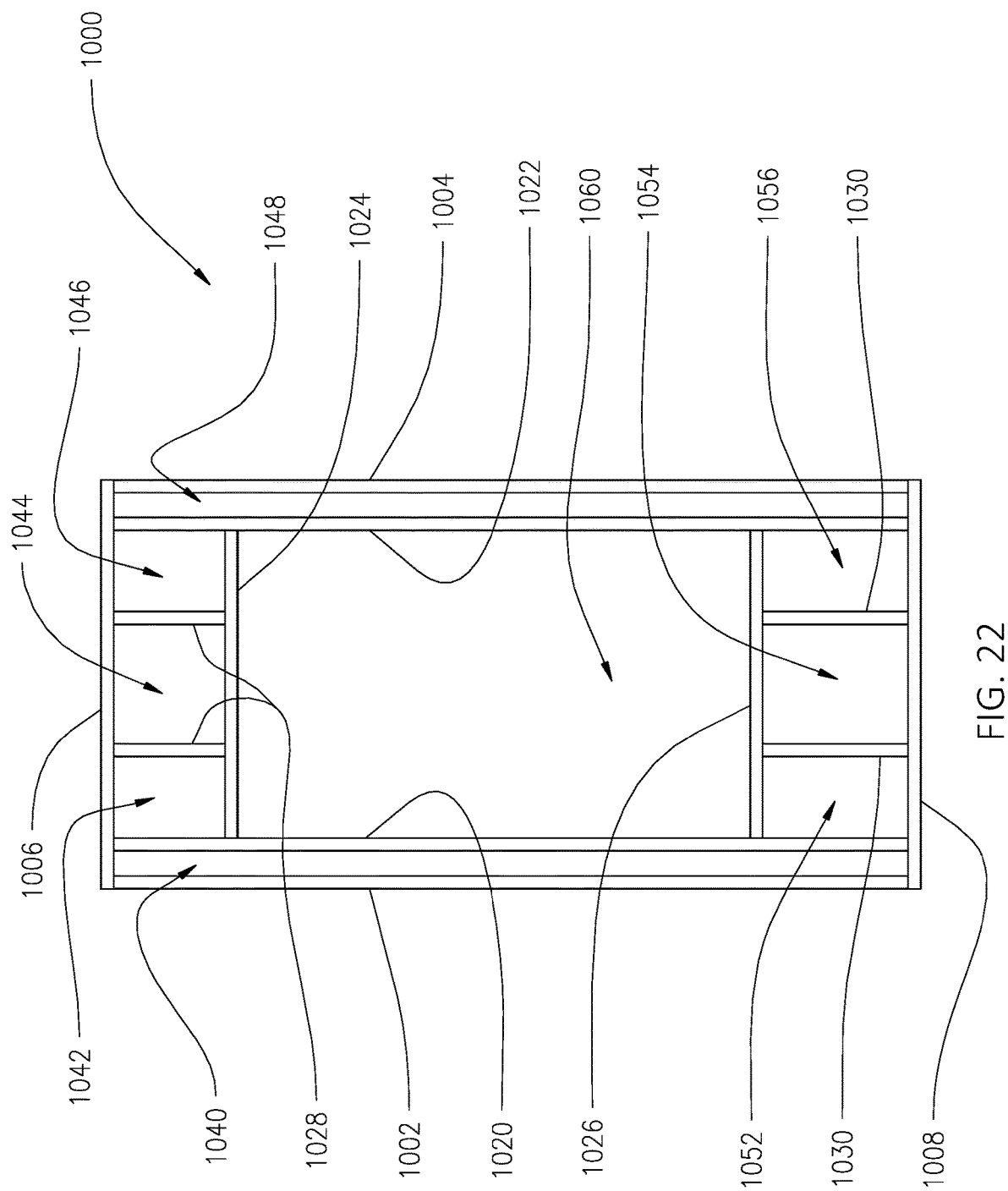
FIG. 22 is a front elevation view of the frame of FIG. 20.

Referring to FIGS. 20-22 the frame 1000 can include the first side exterior stud 1002, a second side exterior stud 1004, the top exterior track 1006 and a bottom exterior track 1008. An upper end of the first side exterior stud 1002 and an upper end of the second side exterior stud 1004 can be attached to the top exterior track 1006. A lower end of the first side exterior stud 1002 and a lower end of the second side exterior stud 1004 can be attached to the bottom exterior track 1008. The frame 1000 can also include a first side interior stud 1020, which can be disposed adjacent the first side exterior stud 1002, and a second side interior stud 1022, which can be disposed adjacent the second side exterior stud 1004. An upper end of the first side interior stud 1020 and an upper end of the second side interior stud 1022 can be attached to the top exterior track 1006. A lower end of the first side interior stud 1020 and a lower end of the second side interior stud 1022 can be attached to the bottom exterior track 1008. The frame 1000 can also include a top interior track 1024 and a bottom interior track 1026. Each of the tracks 1024 and 1026 can extend horizontally between, and can be attached to each one of, the first side interior stud 1020 and the second side interior stud 1022. Frame 1000 and also include a plurality of upper interior connecting members 1028 and a plurality of lower interior connecting members 1030. Each of the connecting members 1028 can be attached to each one of the top exterior track 1006 and the top interior track 1024. Each of the connecting members 1030 can be attached to each one of the bottom exterior track 1008 and the bottom interior track 1026.

Each of the tracks of the frame 1000 can be generally U-shaped as shown in FIG. 20 and can define a cavity, which can receive a plurality of studs of the frame 1000. The studs and tracks of the frames of other building panels disclosed herein, can also engage one another in this manner. For example, the bottom exterior track 1008 of frame 1000 can include a base and two opposing sidewalls, which can extend away from the base. The base and the two opposing sidewalls of the bottom exterior track 1008 can define a channel 1010, which can be shaped and sized to receive an end of one or more of the studs of the frame 1000. For example, as shown in FIG. 20, the lower end of each of the following studs can be disposed within the channel 1010: the first side exterior stud 1002, the first side interior stud 1020, each of the two connecting members 1030, the second side interior stud 1022 and the second side exterior stud 1004. Each of the studs of the frame 1000 can have a cross-sectional shape that is similar to the cross-sectional shape of the tracks of frame 1000, but can also include a pair of lips that can enhance the structural integrity of the studs. For example, as shown in FIG. 21, each of the connecting members 1030 can include a base 1012 and opposed side walls 1014 and 1015 that can extend away from the base 1012. Each connecting member 1030 can also include a lip 1016 that can extend inwardly from the side wall 1014, and a lip 1017 that can extend inwardly from the side wall 1015. Each of the studs of frame 1000 can have a thickness "S", as shown in FIG. 26 with respect to the thickness of one of the connecting members 1028 of frame 1000. In one embodiment, thickness S can be 3½ inches (8.9 cm) and in another embodiment, the thickness S can be 5½ inches (14 cm). However, in yet other embodiments, the magnitude of thickness S can be different than 3½ inches or 5½ inches. Each of the tracks of the frame 1000 can have a thickness "T", as shown in FIG. 21 with respect to the thickness of the bottom exterior track 1008. The magnitude of the thickness T can be equal to the thickness S plus two times the thickness of the material of construction of the tracks. For example, if the tracks are made from 16 gauge galvanized steel, the thickness T can be equal to the thickness S plus two times $\frac{1}{16}^{th}$ inches (0.0625 inches, 1.6 mm), or the thickness S plus $\frac{1}{8}^{th}$ inch (0.125 inches, 3.2 mm).

FIGS. 2-17 illustrate the multi-panel consolidation device 20 of system 10 according to one embodiment. After a frame, e.g., frame 1000, has been assembled on the panel frame assembly fixture 12, and fabric 112 has been applied to the frame, e.g., frame 1000, using the panel fabric application assembly 16, for the building panels that include the fabric 112, the frame can be placed on the multi-panel consolidation device 20 for injection of an expandable polymer that forms a foam, e.g., a foam 500, into the cavities defined by the frame, e.g., the cavities defined by frame 1000. The multi-panel consolidation device 20 can include a base 150, which can include an upper surface 151, and a plurality of posts 152 that can be attached to the base 150, and can extend upwardly from the base 150. The multi-panel consolidation device 20 can also include an upper frame 154, which can be attached to the each of the posts 152.

Figure 3:
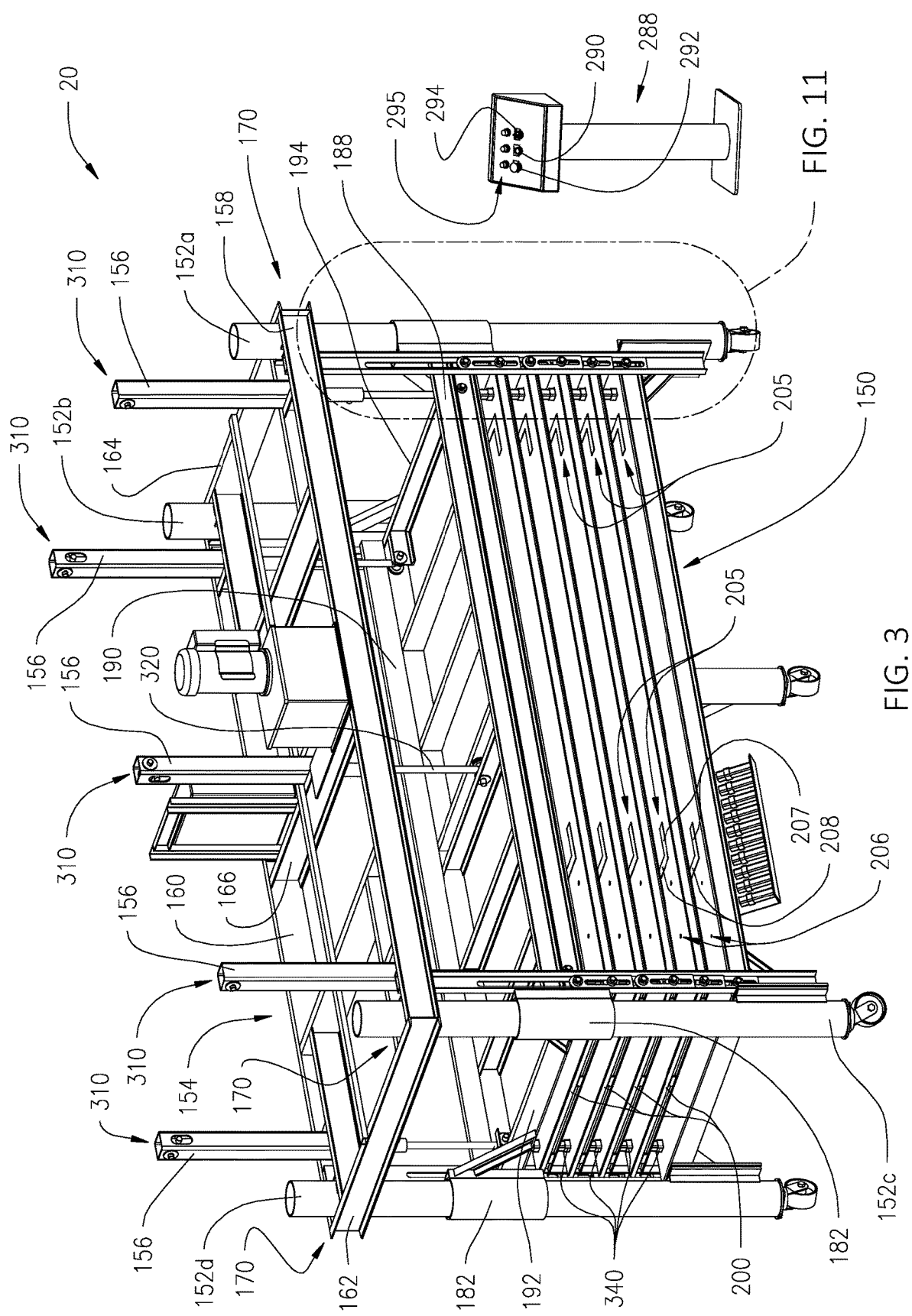
FIG. 3 is a perspective view similar to FIG. 2, but with the shelves of the multi-panel consolidation device depicted in a collapsed configuration.
Figure 4:
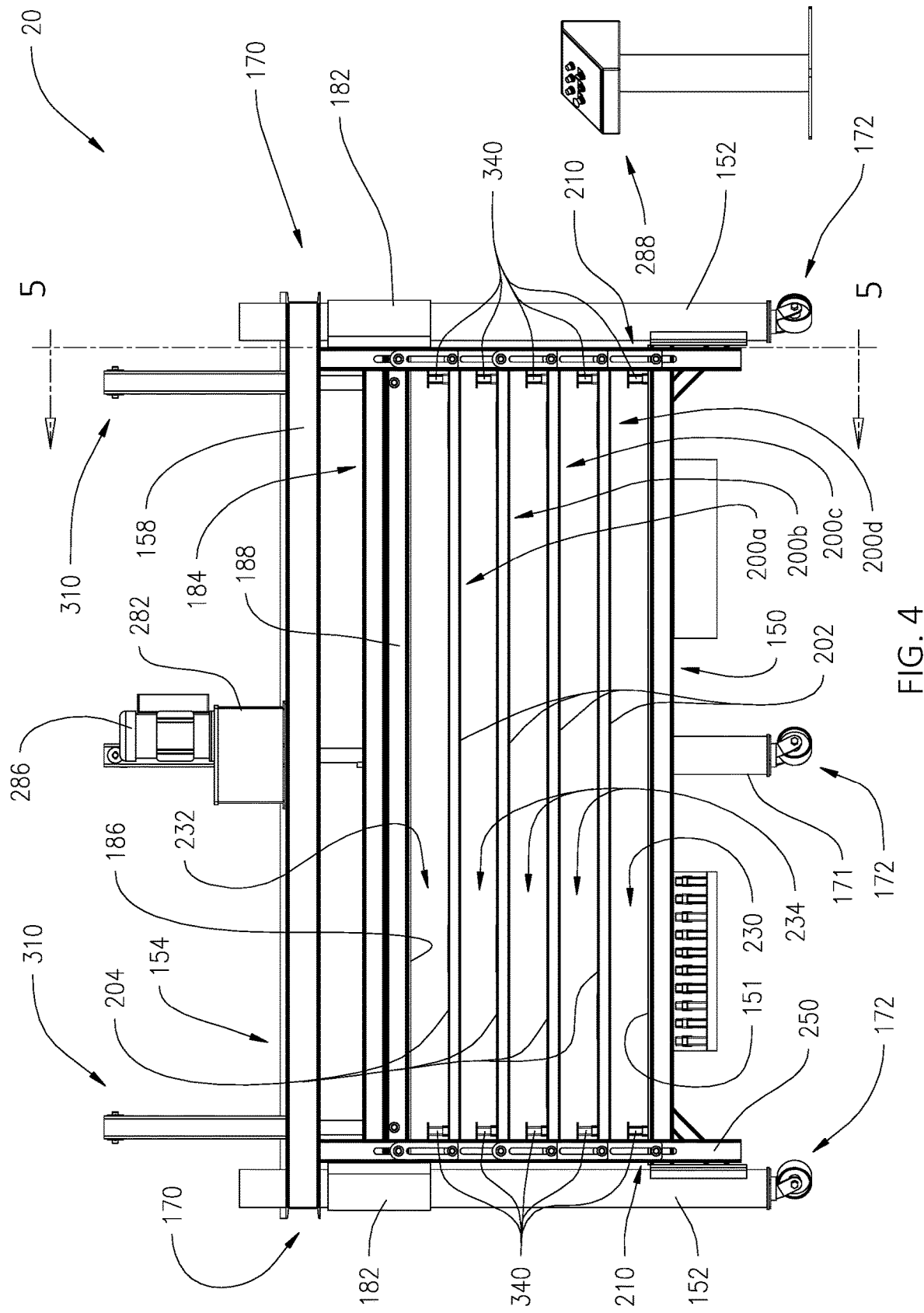
FIG. 4 is a side elevation view of the multi-panel consolidation device of FIG. 2, with the shelves of the multi-panel consolidation device depicted in the expanded configuration.

As shown in FIGS. 3-4, the upper frame 154 can include a first side member 158, a second side member 160, which can be laterally spaced from the first side member 158, a first end member 162 and a second end member 164, which can be longitudinally spaced from the first end member 162. Each of the first side member 158 and the second side member 160 can be attached to each of the first end member 162 and the second end member 164. The upper frame 154 can also include a plurality of interior members, e.g., lateral support members 166, which can be connected to one or more of the first side member 158, the second side member 160, the first end member 162, and the second end member 164. The first side member 158, the second side member 160, the first end member 162 and the second end member 164, can cooperate to form four corner portions, each indicated generally at 170, of the upper frame 154. The multi-panel consolidation device 20 can include a plurality of casters 172, which can be swivel-type casters. One of the casters 172 can be attached to a caster mount member 171 that can be attached to, and can extend downwardly from, the base 150. Each of the remaining casters 172 can be attached to one of the posts 152, and can facilitate moving the multi-panel consolidation device 20 within a manufacturing facility as desired. In other embodiments, the multi-panel consolidation device 20 can include more or less casters.

The multi-panel consolidation device 20 can include an upper structure 180 (FIGS. 2, 3, 5-6), which can be movably coupled with the posts 152, and can be movable vertically downwardly and upwardly relative to the base 150, the posts 152, and the upper frame 154. The multi-panel consolidation device 20 can include a plurality of collars 182. Each of the collars 182 can be attached to the upper structure 180, and can at least partially surround one of the posts 152. The collars 182 can be slideable along the posts 152, such that the collars 182 can movably couple the upper structure 180 with the posts 152. The upper structure 180 can include a base 184, which can include a lower surface 186, which can be a lower surface of the upper structure 180. The upper structure 180 can also include a first side member 188, a second side member 190 laterally spaced from the first side member 188, a first end member 192 and a second end member 194 longitudinally spaced from the first end member 192. Each of the first side member 188 and the second side number 190 can be attached to each of the base 184, the first end member 192 and the second end member 194.

The multi-panel consolidation device 20 can include a plurality of shelves 200 (FIGS. 2-7), and a plurality of link assemblies 210 (FIGS. 2-4, 9, 11). The shelves 200 can be vertically spaced, and can be disposed vertically between the base 150 and the upper structure 180. The shelves 200 can be connected to the upper structure 180, and can be interconnected with one another, with the link assemblies 210. The shelves 200 can be movable upwardly and downwardly relative to the posts 152 and the base 150 between an expanded configuration shown in FIGS. 2, 2, 5 and 7, and a collapsed configuration shown in FIGS. 3 and 6. At least some of the shelves 200 can be movable relative to one another. Each of the shelves 200 can include a lower surface 202 and an upper surface 204. The shelves 200 can include a lower plate 212, an upper plate 214, and a plurality of laterally extending ribs 216 disposed vertically between the lower plate 212 and the upper plate 214, for example, in the embodiment of the shelves 200 illustrated in FIGS. 2-16. In this embodiment the lower surface 202 of shelf 200 can be a lower surface of the lower plate 212, and the upper surface 204 of shelf 200 can be an upper surface of the upper plate 214. The ribs 216 can be attached to one or both of the lower plate 212 and the upper plate 214. In other embodiments, shelves 200 can have a different configuration. For example, a single plate can be used instead of the lower plate 212, upper plate 214 and ribs 216. In one embodiment, the ribs 216 of each of the shelves 200, can be at least substantially aligned with the ribs 216 of each vertically adjacent one of the shelves 200.

Shelves 200 can include a first side member 218 and a second side member 220, which can be laterally spaced from the first side member 218. Shelves 200 can also include a forward end structure 222 and a rearward end structure 224, which can be longitudinally spaced from the forward end structure 222. Each of the first side member 218, the second side member 220, the forward end structure 222 and the rearward end structure 224 can be attached to one of, or any combination of, the lower plate 212, the upper plate 214 and the ribs 216. The forward end structure 222 can include an elongate member 226, which can protrude outwardly beyond each of the first side member 218 and the second side member 220. The rearward end structure 224 can include an elongate member 228, which can protrude outwardly beyond each of the first side member 218 and the second side member 220. At least each end of each one of the elongate member 226 and the elongate member 228 can have a cylindrical shape, and in one embodiment can be a solid cylinder. Referring to FIGS. 10 and 12, the upper structure 180 can include a plurality of studs 240, with two of the studs protruding laterally outwardly from the first side member 188 and two of the studs 240 protruding outwardly from the second side member 190 of the upper structure 180. The base 150 can include a first side member 242, a second side member 244, which can be laterally spaced from the first side member 242, and a plurality of studs 246. Two of the studs 246 can be attached to, and can extend laterally outwardly from, the first side member 242, and two of the studs 246 can be attached to, and can extend laterally outwardly from, the second side member 244, as shown in FIGS. 10 and 12 for one of the studs 246 and the first side member 242.

The multi-panel consolidation device 20 can include four of the link assemblies 210. Each of the link assemblies 210 can include a guide member 250 and a plurality of links 252. For each of the link assemblies 210, the guide member 250 can be attached, at an upper end, to the upper frame 154 of the multi-panel consolidation device 20. Each of the guide members 250 can be attached, at a lower end, to one of the posts 152 and/or to the base 150. Each of the guide members 250 can define a slot 253, as shown in FIGS. 10 and 12 for one of the guide members 250, which can be attached to a right side, forward one of the posts, designated 152a in FIGS. 9-11, and can be attached to the upper frame 154 adjacent a right side, forward one of the corner portions 170 of the upper frame 154.

Each of the links 252 can define an upper aperture 254 and a slot 256, which can be disposed below the upper aperture 254 and can extend longitudinally. For each of the link assemblies 210, one of the studs 240 of the upper structure 154 can extend through the slot 253 defined by the guide member 250 and the upper aperture 254 of the uppermost one of the links, identified as link 252a for one of the link assemblies 210. Each stud 240 can be secured by one of a plurality of female fasteners 260. For each of the link assemblies 210, one of the studs 246 of the base 150 can extend through the slot 253 defined by the guide member 250 and the slot 256 defined by a lowermost one of the links 252, identified as link 252e for one of the link assemblies 210. For each of two forward ones of the link assemblies 210, i.e., the link assemblies 210 that are disposed adjacent to the forward ones of the posts 152, identified as posts 152a and 152b, the elongate member 226 of each shelf 200 can extend through the slot 253 defined by the guide member 250, through an upper aperture 254 of a first one of the links 252 (e.g., link 252c), and through the slot 256 defined by a vertically adjacent, second one of the links 252 (e.g., link 252b), which extends above the first one of the links (e.g., link 252c). Similarly, for each of two rearward ones of the link assemblies 210, i.e., the link assemblies 210 that are disposed adjacent to the rearward ones of the posts 152, identified as posts 152c and 152d, the elongate member 228 of each shelf 200 can extend through the slot 253 defined by the guide member 250, through an upper aperture 254 of a first one of the links 252, and through the slot 256 defined by a vertically adjacent, second one of the links 252, which extends above the first one of the links 252. The overlapping relationship between the upper aperture 254 defined by a lower one of a vertically adjacent pair of the shelves 200, and the slot 256 defined by an upper one of a vertically adjacent pair of the shelves 200, facilitates moving the shelves 200 vertically between the expanded and collapsed configurations.

Figure 17:
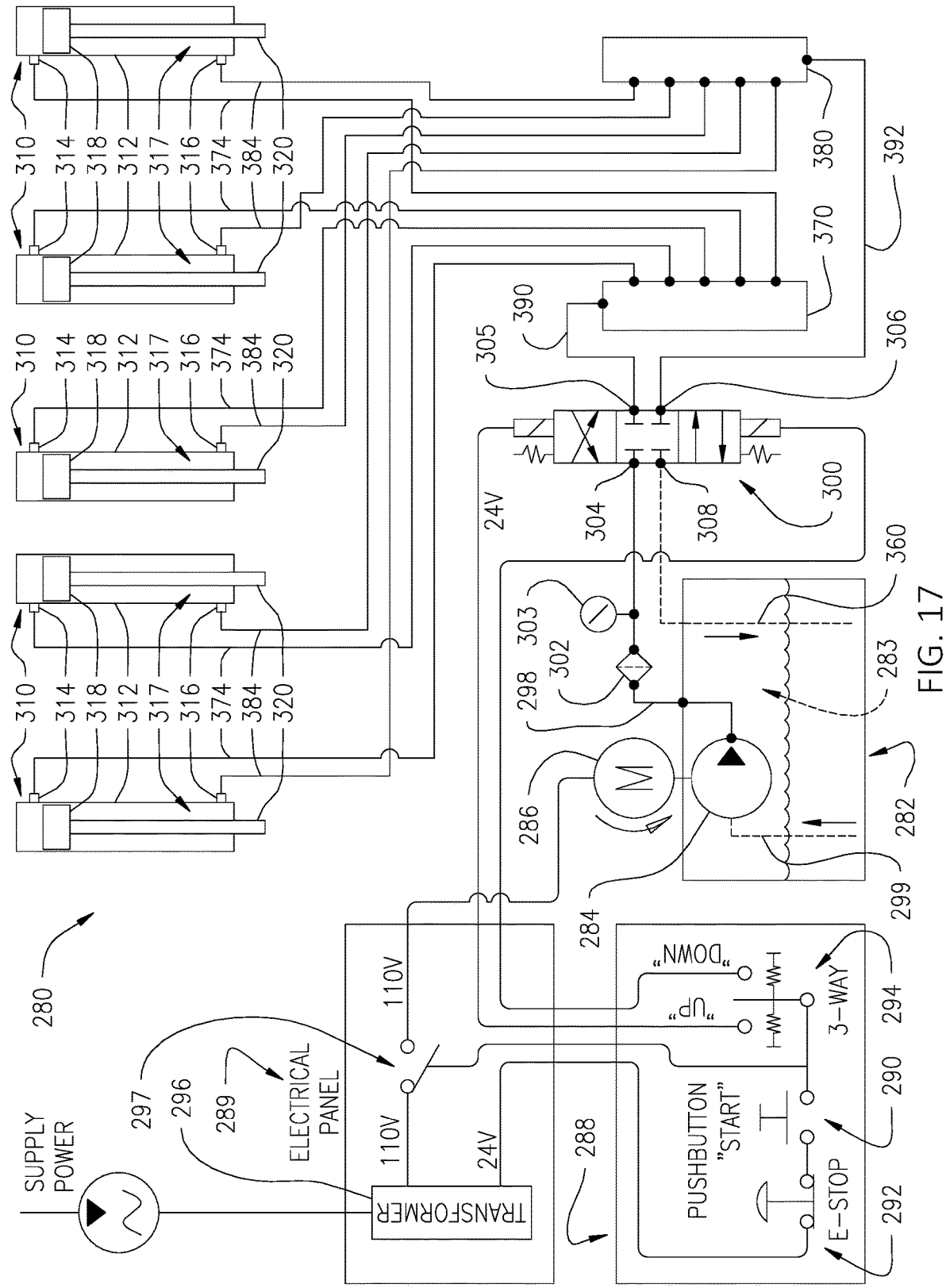
FIG. 17 is a schematic representation of a hydraulic system of the multi-panel consolidation device of FIG. 16.

The multi-panel consolidation device 20 can include a hydraulic system 280, which is illustrated schematically in FIG. 17. Portions of the hydraulic system 280 are also shown in FIGS. 2-7, and 11-16. The hydraulic system 280 can provide the motive force to move the upper structure 180 and the shelves 200 downwardly and upwardly, with the shelves 200 being movable between the expanded configuration shown in FIG. 2 and the collapsed configuration shown in FIG. 3. The hydraulic system 280 can include a source of hydraulic fluid 282, e.g., a tank or other container that defines an interior chamber 283 suitable for containing hydraulic fluid, a pump 284, and an electric motor 286, which can be electrically coupled with the pump 284 and can be operable for turning the pump 284 on and off. The hydraulic system 280 can also include an operator console 288, which can be positioned so that an operator (not shown) can view the multi-panel consolidation device 20 while standing at the operator console 288. The operator can turn the electric motor 286, and therefore the pump 284, on and off, by depressing or releasing a start button 290. The electric motor 286 and the pump 284 can also be turned off by depressing an emergency stop button 292, which can be located on the operator console 288. The operator console 288 can also include a switch 294 that can include up and down positions, which can cause the upper structure 180 and the shelves 200 to move upwardly and downwardly, respectively. The switch 294 can be configured such that an operator must maintain the switch 294 in either the up or down positions to maintain movement of the upper structure 180 and the shelves 200. The switch 294 can also include a neutral, off position. The operator console 288 can also include a plurality of indicator lights 295, and each of the lights 295 can correspond to one of the buttons 290, 292 and the switch 294.

The hydraulic system 280 can include an electrical panel 289, which can be supported by the upper frame 154 of the multi-panel consolidation device 20. Electrical power can be supplied to a transformer 296, which can be attached to the electrical panel 289. The transformer 296 can provide 24 VDC to the emergency stop button 292, as shown in FIG. 17. When the start button 290 is depressed, 24 VDC can be supplied to a normally open switch 297, causing the switch 297 to close, such that the electrical power can be supplied to the motor 286 from the transformer 296, which can start the motor 286. In one embodiment, the motor can utilize 110 VAC. In another embodiment, the motor can utilize 220 VAC.

The pump 284 can include an inlet port and a discharge port. When the pump 284 is on, hydraulic fluid can be drawn from the source of hydraulic fluid 282, through a conduit 299 and into the pump inlet port. A lower end of the conduit 299 can be immersed in the hydraulic fluid within the interior chamber 283. Pressurized hydraulic fluid can discharge from the discharge port of the pump 284 into a pump discharge conduit 298, which can extend to a distribution valve 300. A filter 302 and a pressure gauge 303 can be in fluid communication with the conduit 298. The hydraulic system 280 can also include a pressure relief valve (not shown), which can be in fluid communication with the pump discharge conduit 298, and can prevent over pressurization of the portion of the hydraulic system downstream of the pump 284. The distribution valve 300 can include fluid ports 304, 305, 306 and 308. The pump discharge conduit 298 can be in fluid communication with the fluid port 304 of the distribution valve 300. The hydraulic system 280 can include a return conduit 360, which can be in fluid communication with the fluid port 308 of the distribution valve 300 and the interior chamber 283 defined by the source of hydraulic fluid 282.

The hydraulic system 280 can also include a plurality of hydraulic cylinders 310, which can be in selective fluid communication with the source of hydraulic fluid 282, e.g., when the motor 286 and the pump 284 have been turned on and are operating. Each of the hydraulic cylinders 310 can include a housing 312, which can include a first fluid port 314 and a second fluid port 316, and can define an interior chamber 317. The interior chamber 317 defined by each of the hydraulic cylinders 310 can be in selective fluid communication with the interior chamber 283 defined by the source of hydraulic fluid 282. Each of the fluid ports 314 and 316 can be in fluid communication with the interior chamber 317. Each of the hydraulic cylinders 310 can also include a piston 318, which can be disposed within the interior chamber 317 defined by the housing 312. Each of the hydraulic cylinders 310 can also include a piston rod 320, which can be attached to the piston 318, and can be movable upwardly and downwardly with the piston 318. A portion of the piston rod 320 can be disposed within the interior chamber 317 and a portion of the piston rod 320 can extend below the housing 312. Hydraulic system 280 can include a first manifold 370, a plurality of conduits 374 that can be in fluid communication with the first manifold 370, a second manifold 380 and a plurality of conduits 384 that can be in fluid communication with the second manifold 380. Each of the conduits 374 can also be in fluid communication with the fluid port 314 of one of the hydraulic cylinders 310, and each of the conduits 384 can also be in fluid communication with the fluid port 316 of one of the hydraulic cylinders 310.

The multi-panel consolidation device 20 can include a plurality of hollow tubes 156, which can be attached to the upper frame 154 of the multi-panel consolidation device 20, e.g., welded. At least a portion of the housing 312 of each of the hydraulic cylinders 310 can be disposed within an interior space defined by one of the hollow tubes 156. In one embodiment, each of the housings 312 can be coupled, at an upper end, with one of the hollow tubes 156. In one embodiment, each of the housings 312 can be pivotally coupled, at an upper end, with one of the hollow tubes 156, which can permit the housings 312 to pivot relative to a corresponding one of the hollow tubes 156. Each of the housings 312 can extend below the corresponding one of the hollow tubes 156. A distal end 322 of each of the piston rods 320 can be coupled with the upper structure 180. In one embodiment, the distal end 322 of each of the piston rods 320 can be pivotally coupled with a mount structure 324 of the upper structure 180. The mount structure 324 can include a pin, and an associated bracket, or brackets, which can permit the piston rod 320 to pivot relative to the upper structure 180.

The pivotal coupling of the upper end of each of the housings 312 with the corresponding one of the hollow tubes 156, combined with the pivotal coupling of the distal end 322 of each of the piston rods 320 with the corresponding one of the mount structures 324 of the upper structure 180, can facilitate maintaining an alignment between the pistons 318 and the piston rods 320 with the housings 312. This can prevent binding of the pistons 318 within the housings 312, which could at least inhibit the ability of the upper structure 180 and the shelves 200 to move upwardly and downwardly. The hydraulic system 280 can include five of the hydraulic cylinders 310. The piston rod 320 of one of the hydraulic cylinders 310 can be coupled with the upper frame 154 at the longitudinal and lateral center of the upper frame 154, or in close proximity to the longitudinal and lateral center of the upper frame 154. This piston rod 320 can be aligned with the central one of the ribs 216 of each of the shelves 200. The piston rod 320 of each of the remaining four hydraulic cylinders 310 can be coupled with the upper frame at, or in close proximity to, one of the corner portions 170 of the upper frame 154. This positioning of the hydraulic cylinders 310 can facilitate smooth and consistent operation of the multi-panel consolidation device 20, i.e., that can prevent, or at least inhibit, binding of one or more of the collars 182 with the posts 152, as the collars 182 slide along the posts 152 as the upper structure 180 and the shelves 200 move upwardly and downwardly.

When an operator wants to force the shelves 200 of the multi-panel consolidation device 20 downwardly from an expanded configuration to a collapsed configuration, the operator can turn the switch 294 to the down position, and maintain the switch 294 in this position until the shelves 200 are in the collapsed configuration. When the switch 294 is in the down position, the fluid ports 304 and 305 of the distribution valve 300 can be in fluid communication. As a result the pump discharge conduit 298 can be in fluid communication with a conduit 390, which can be in fluid communication with the fluid port 305 and the first manifold 370. Relatively high pressure hydraulic fluid can flow through the pump discharge conduit 298, distribution valve 300 and conduit 390 to the first manifold 370. The relatively high pressure hydraulic fluid can then flow through each of the conduits 374 to the fluid ports 314 of the hydraulic cylinders 310, and into the interior chambers 317 defined by the housings 312 of the hydraulic cylinders 310, on an upstream side of the pistons 318. As a result, the pistons 318 and piston rods 320 can be forced downwardly, such that the piston rods 320 are in an extended position.

Due to the attachment of the piston rods 320 to the upper structure 180 and the connection of the shelves 200 to the upper structure 180, via the link assemblies 210, the shelves 200 can be forced downwardly with the upper structure 180, toward the collapsed configuration of the shelves 200. As the piston 318 of each hydraulic cylinder 310 is forced downwardly, the relatively low pressure hydraulic fluid within the interior chamber 317, on the downstream side of the piston 318, can be forced out of the fluid port 316 of the hydraulic cylinder 310 and through one of the conduits 384 to the second manifold 380. The relatively low pressure hydraulic fluid can discharge from the second manifold 380 through a conduit 392 to the fluid port 306 of the distribution valve 300. When the switch 294 is in the down position, the fluid ports 306 and 308 of the distribution valve 300 can be in fluid communication. As a result, the relatively low pressure hydraulic fluid can flow through the distribution valve 300 and into the interior chamber 283 defined by the source of hydraulic fluid 282, via the return conduit 360.

Similarly, when the pump 284 is on and the switch 294 is in the up position, relatively high pressure hydraulic fluid in the pump discharge conduit 298 can be supplied to a downstream side of each of the pistons 318. This can force each of the pistons 318 and the associated piston rods 320 upwardly, which in turn, can force the upper structure 180, and the shelves 200, to move upwardly toward an expanded configuration of the shelves 200. When the switch 294 is in the up position, the fluid ports 304 and 306 of the distribution valve 300 can be in fluid communication, and the fluid ports 308 and 305 can be in fluid communication. As a result, the relatively high pressure hydraulic fluid in the pump discharge conduit 298 can flow through the distribution valve 300 and conduit 392 to the second manifold 380. The relatively high pressure hydraulic fluid can then flow through the conduits 384 to the fluid ports 316 of the hydraulic cylinders 310, and into the interior chamber 317 of each of the hydraulic cylinders 310, on the downstream side of the respective piston 318. This can force the pistons 318 and the piston rods 320 upwardly, such that the piston rods 320 are in a retracted position. The upward movement of the pistons 318 can force the relatively low pressure hydraulic fluid on the upstream side of the pistons 318 to discharge through the fluid ports 314 to the first manifold 370 via the conduits 374. The relatively low pressure hydraulic fluid can then flow through conduit 390, distribution valve 300 and conduit 360 into the chamber 283 defined by the source of hydraulic fluid 282.

Figure 13:
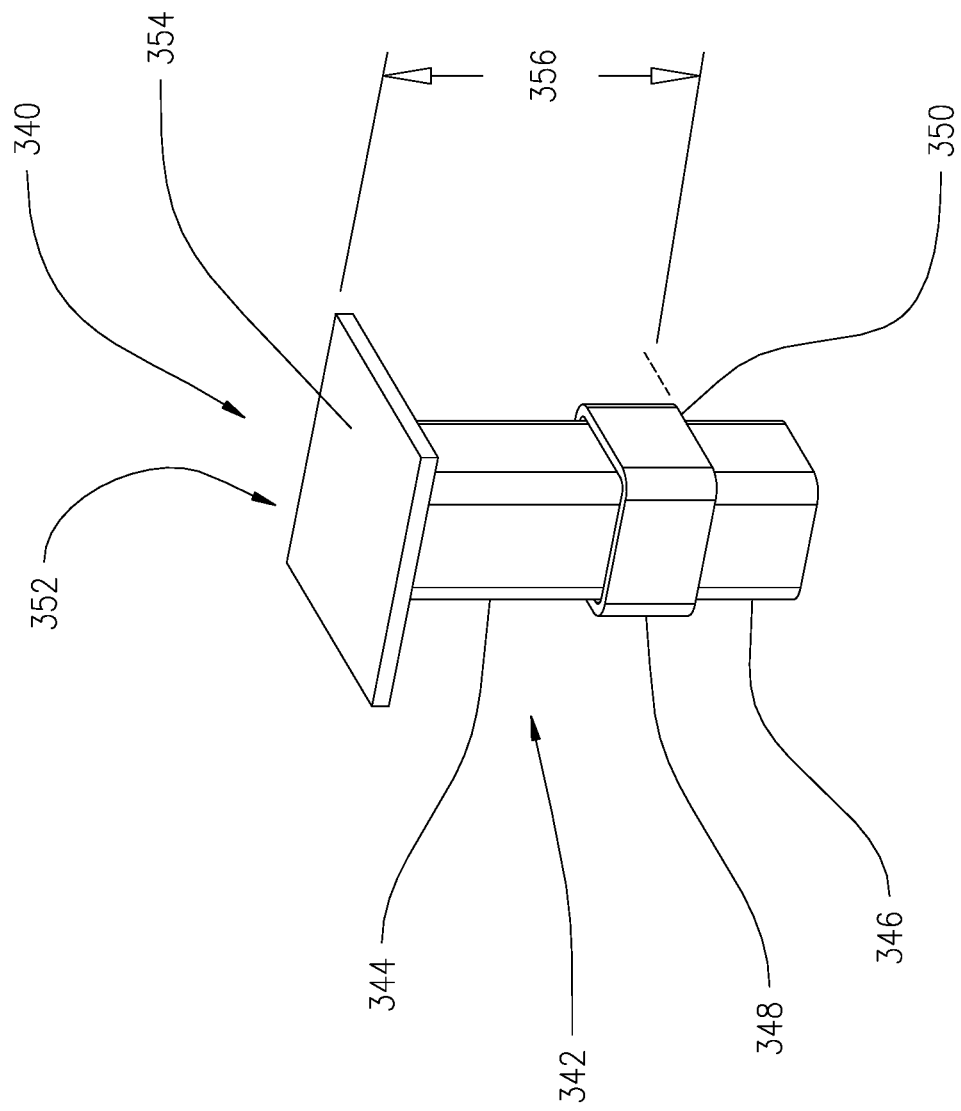
FIG. 13 is an enlarged perspective view of a spacer of the multi-panel consolidation device of FIG. 2.
Figure 16:
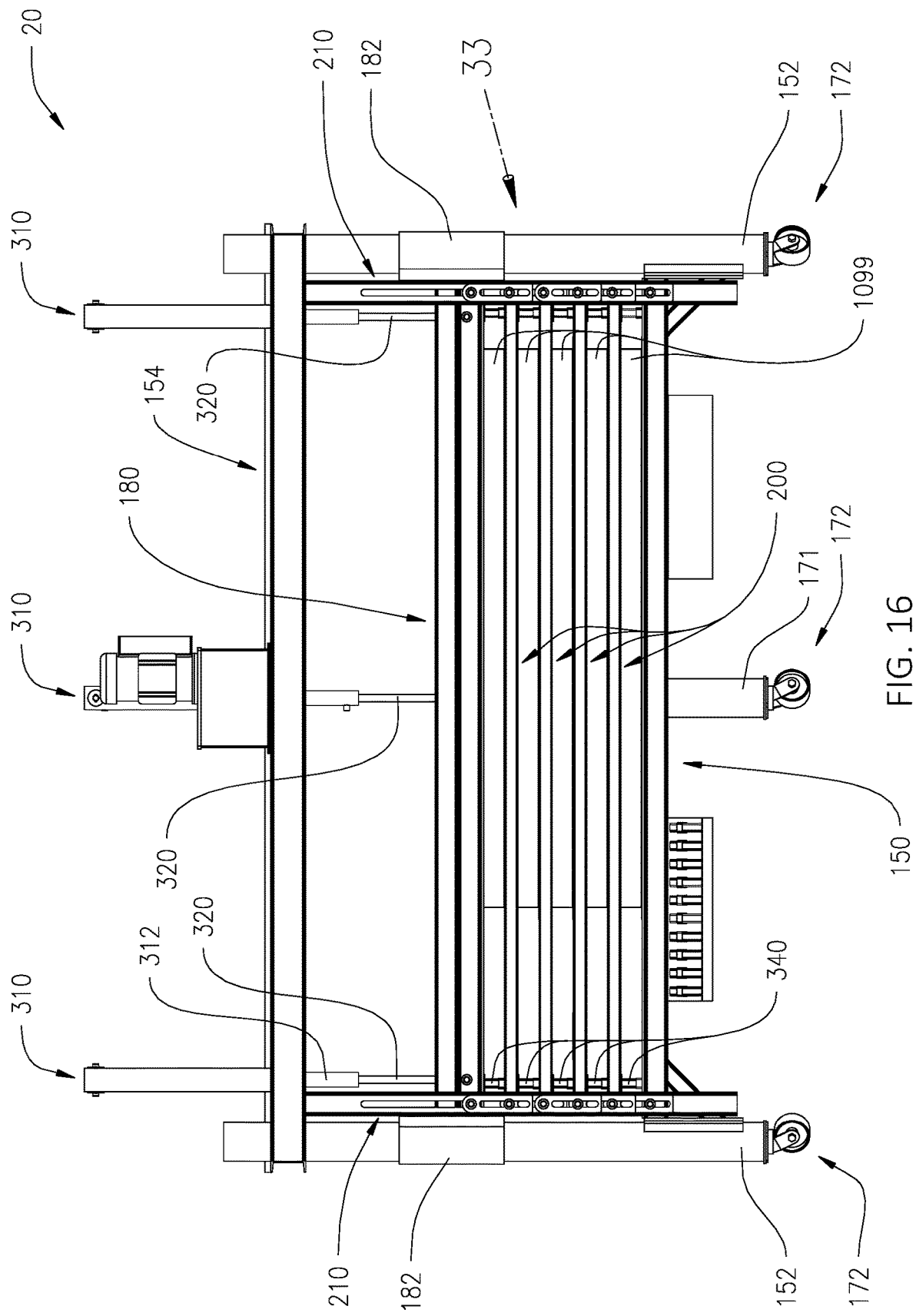
FIG. 16 is a side elevation view depicting the five building panels shown in FIGS. 13 and 14, with the shelves of the multi-panel consolidation device depicted in the collapsed configuration.

The multi-panel consolidation device 20 can include a plurality of spacers 340. As shown in FIG. 13, spacers 340 can include a stem 342, which can include an upper portion 344 and a lower portion 346. Spacers 340 can also include a collar 348, which can include a lower surface 350, and can at least partially surround the stem 342. The spacers 340 can also include a contact plate 352, which can include a contact surface 354. The contact plate 352 can be attached to the upper portion 344 of the stem 342. Each of the spacers 340 can be releasably connected to the base 150 or one of the shelves 200 of the multi-panel consolidation device 20. In one embodiment, the lower portion 346 of the stem 342 of each spacer 340 can be disposed within an aperture (not shown) defined by the base 150 or an aperture (not shown) defined by a respective one of the shelves 200. Each spacer 340 can extend into a space 230 between the base 150 and a lowermost one of the shelves 200, a space 232 between the uppermost one of the shelves 200 and the upper structure 180, or a space 234 between two vertically adjacent ones of the shelves 200. The collar 348 can be sized and configured such that it is larger than the aperture into which the lower portion 346 of the stem 342 is inserted. Accordingly, the lower surface 350 of the collar 348 of each spacer 340 can contact the upper surface 151 of the base 150, or the upper surface 204 of one of the shelves 200, to which the spacer 340 is releasably connected.

A first plurality of the spacers 340, identified as 340a, can be releasably connected to, and can extend upwardly from, an uppermost one of the shelves 200, identified as 200a. A second plurality of the spacers 340, identified as 340b, can be releasably connected to, and can extend upwardly from, the shelf 200 identified as 200b. A third plurality of the spacers 340, identified as 340c, can be releasably connected to, and can extend upwardly from, the shelf 200 identified as shelf 200c. A fourth plurality of the spacers 340, identified as 340d, can be releasably connected to, and can extend upwardly from, the shelf 200 identified as shelf 200d. A fifth plurality of the spacers 340, identified as 340e, can be releasably connected to, and can extend upwardly from, the base 150. When the shelves 200 are in an expanded configuration, each of the first plurality of the spacers 340a can be vertically spaced below the upper structure 180, and each of the spacers 340b, 340c, 340d and 340e of each of the second, third, fourth, and fifth pluralities, respectively, of the spacers 340 can be vertically spaced below the respective shelf 200 which is disposed immediately above the spacer 340.

The spacer 340 can include a height 356 (FIG. 27), which can extend between the lower surface 350 of the collar 348 and the upper surface 354 of the contact plate 352. When the shelves 200 are in the collapsed configuration: the upper surface 354 of the contact plate 352 of each of the spacers 340a can contact the lower surface 186 of base 184 of the upper structure 180; the upper surface 354 of the contact plate 352 of each of the spacers 340b can contact the lower surface 202 of the shelf 200a; the upper surface 354 of the contact plate 352 of each of the spacers 340c can contact the lower surface 202 of the shelf 200b; the upper surface 354 of the contact plate 352 of each of the spacers 340d can contact the lower surface 202 of the shelf 202c; and the upper surface 354 of the contact plate 352 of each of the spacers 340e can contact the lower surface 202 of the shelf 202d. The height 356 of spacer 340 can be the same as, or substantially the same as the thickness S of the studs of a frame of a building panel, e.g., the thickness S of one of the upper interior connecting members 1028 of the frame 1000 of the building panel 1099, as shown in FIG. 26. In an alternative embodiment, the height 356 of spacer 340 can be the same as, or substantially the same as the thickness T of the tracks 1006,1008 of a frame of a building panel. In one embodiment, the height 356 can be 3½ inches (8.9 cm). In another embodiment, the height 356 can be 5½ inches (14 cm). In an aspect of the invention, the height of the spacers 340 defines the minimum distance between the respective surfaces of successive shelves, limits any crushing of the studs or tracks of a frame beyond such minimum distance. Once the lower surface of a descending upper shelf has contacted the upper surfaces of the spacers, the shelf can descend no further, and the spacers 340 withstand the any increased force applied to the shelf. This can prevent the studs of the frames of the building panels disposed on the base 150 and the shelves 200 from being crushed between the shelves when the shelves 200 are in the collapsed configuration. The lower surface 186 of the base 184 of the upper structure 180, or the lower surface 202 of one of the shelves 200 can contact and apply a first compressive force to the contact surfaces 354 of the spacers 340, and can apply a second compressive force, less than the first compressive force, to the top surface of the studs of each of the frames positioned on the base 150 and the shelves 200. The spacers 340 are non-compressible to the force of the descending shelf. In one embodiment, the tracks of each frame positioned on the base 150 or one of the shelves 200 can be crushed, or deformed somewhat under the second compressive force, since the thickness T of the tracks of the frames can be greater than the thickness S of the studs of the frames. The structural integrity of the frames can be maintained despite the deformation of the tracks. In another embodiment, the thickness T of the tracks can be the same as the thickness S of the studs.

The multi-panel consolidation device 20 can include a plurality of panel positioning members 205 (FIGS. 2 and 3), which can facilitate positioning a frame of a building panel (e.g., frame 1000 of building panel 1099) on the base 150, or any one of the shelves 200. In one embodiment, four of the panel positioning members 205 can be attached to the base 150 and four of the panel positioning members 205 can be attached to each of the shelves 200. In one embodiment, one pair of the panel positioning members 205, designated 205a for one of the panel positioning members 205, can be fixedly attached (e.g., welded) to each of the shelves 200 adjacent to one end of the shelf 200. Another pair of the panel positioning members 205, designated 205b for one pair of the panel positioning members 205, can be releasably attached to each of the shelves 200, adjacent an opposite end of the shelf. Two pairs of panel positioning members 205 can be attached to the base 150 in a similar manner. In other embodiments, each of the panel positioning members 205 can be releasably attached, or fixedly attached, to the base 150 or one of the shelves 200. A first one and a second one of each pair of the panel positioning members 205 can be positioned equidistant from the forward end structure 222 and the rearward end structure 224 of the shelf 200, or from the forward and rearward surfaces of the base 150, to which the panel positioning members 205 are attached. The base 150 and each shelf 200 can define a plurality of apertures 206, which can accept pins (not shown), or similar members, of the panel positioning members 205.

Each of the panel positioning members 205 can include a first leg 207 and a second leg 208, which can define a 90 degree angle. This configuration of the panel positioning members 205 can facilitate positioning each corner of a frame of a building panel (e.g., frame 1000 of building panel 1099) against one of the panel positioning members 205, which can control the position of the frame on the base 150 or one of the shelves 200. The apertures 206 can be arranged to facilitate positioning frames of building panels having a variety of lengths, for example, eight, nine and ten feet (about 2.44, 2.74, or 3.05 meter). For example, the frame 1000 of building panel can have a width 1078 and a length 1080, and in certain embodiments, the length 1080 can be eight feet, nine feet or ten feet (about 2.44, 2.74, or 3.05 meter). In one embodiment, the width 1078 can be four feet (about 1.22 m), but can have different widths in other embodiments.

Figure 28:
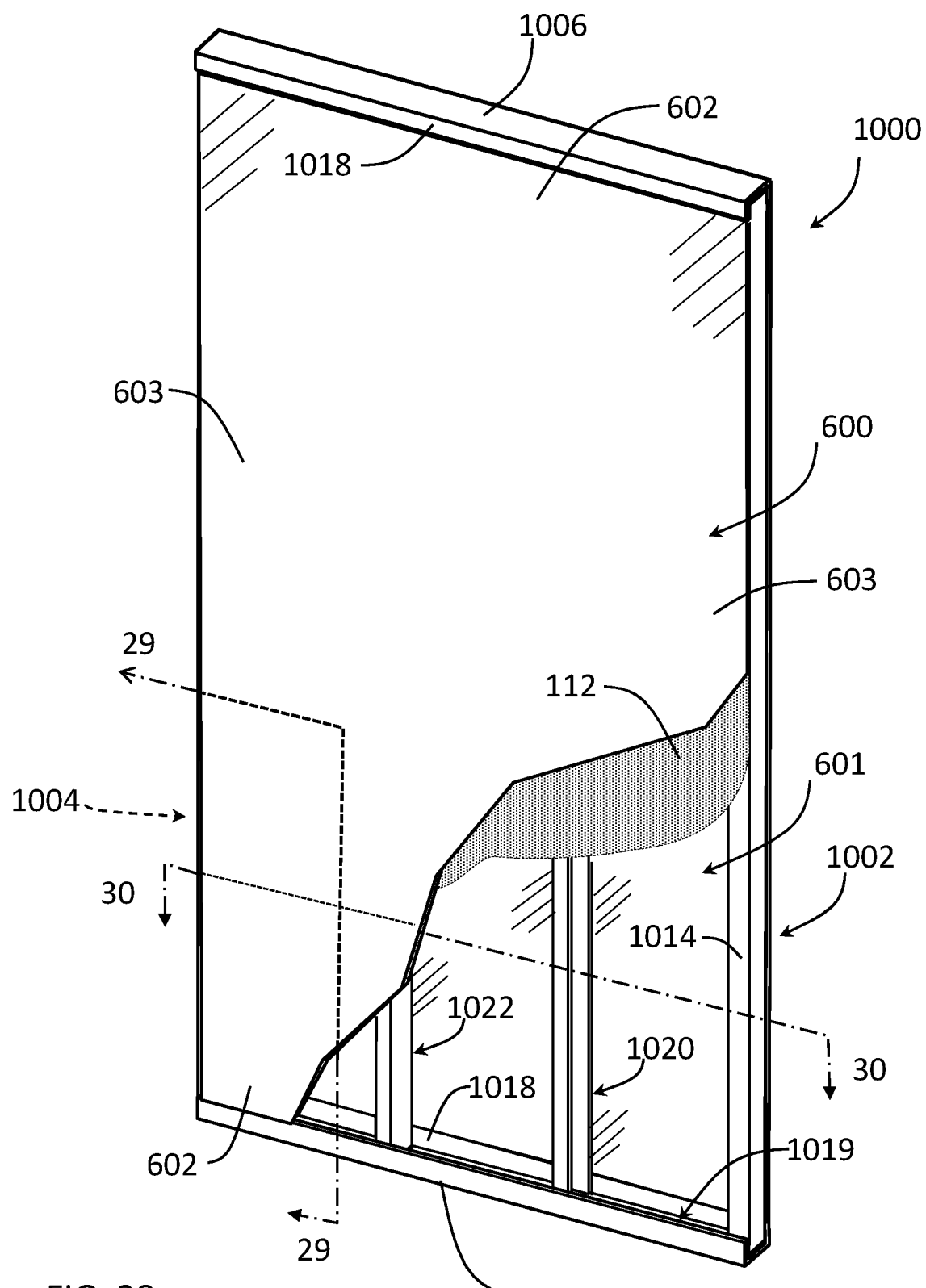
FIG. 28 shows another embodiment of the invention of a building panel employing a sealing sheet or plate placed against the frame of the building panel, to prevent excessive leakage of expandable foam during injection within the multi-panel consolidation device.
Figures 29, 30:
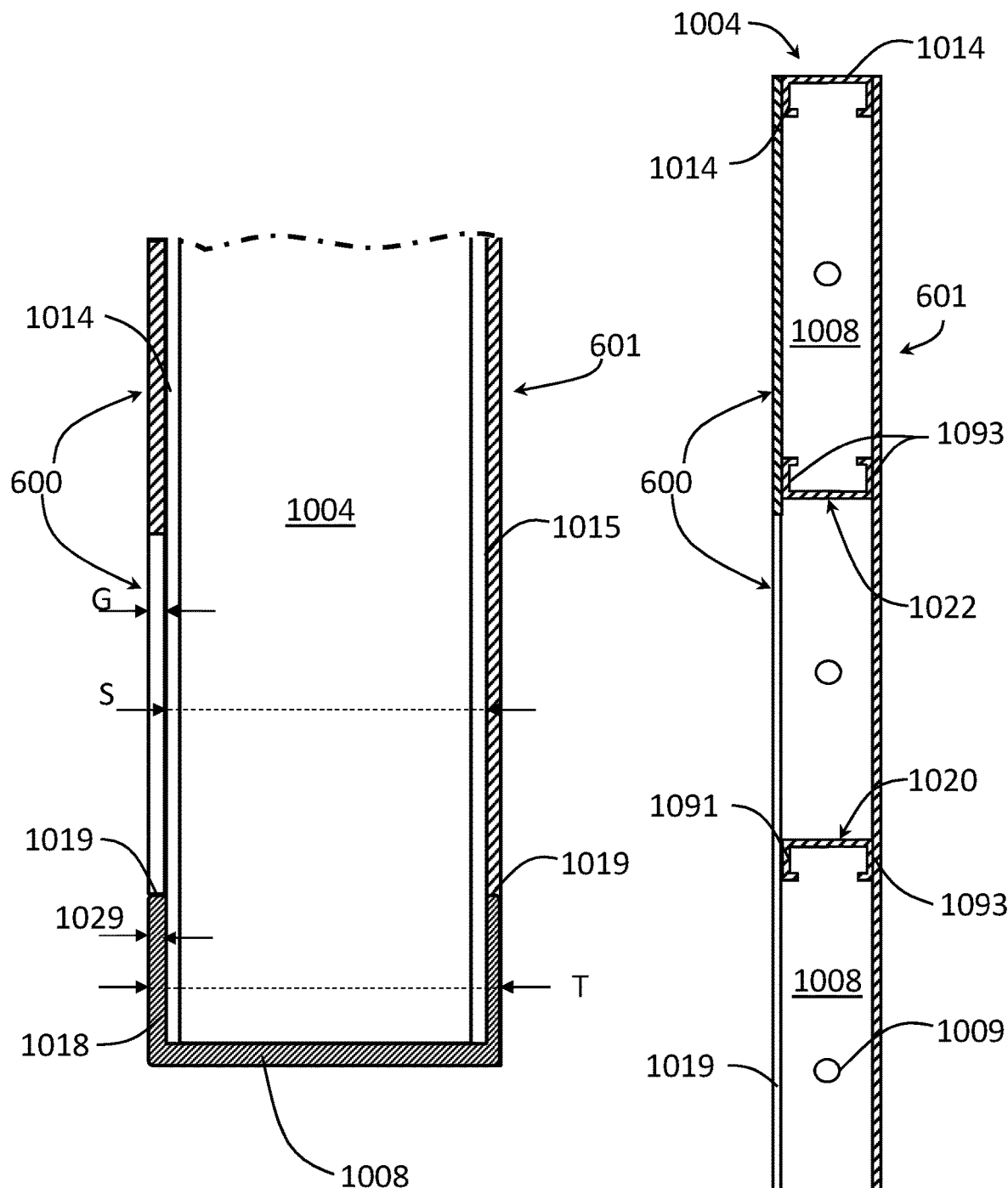
FIG. 29 is a plan sectional view of the building panel with sealing sheet or plate taken through line 29-29 of FIG. 28.
FIG. 30 is an elevation sectional view of the building panel with sealing sheet or plate taken through line 30-30 of FIG. 28.
Figure 31:
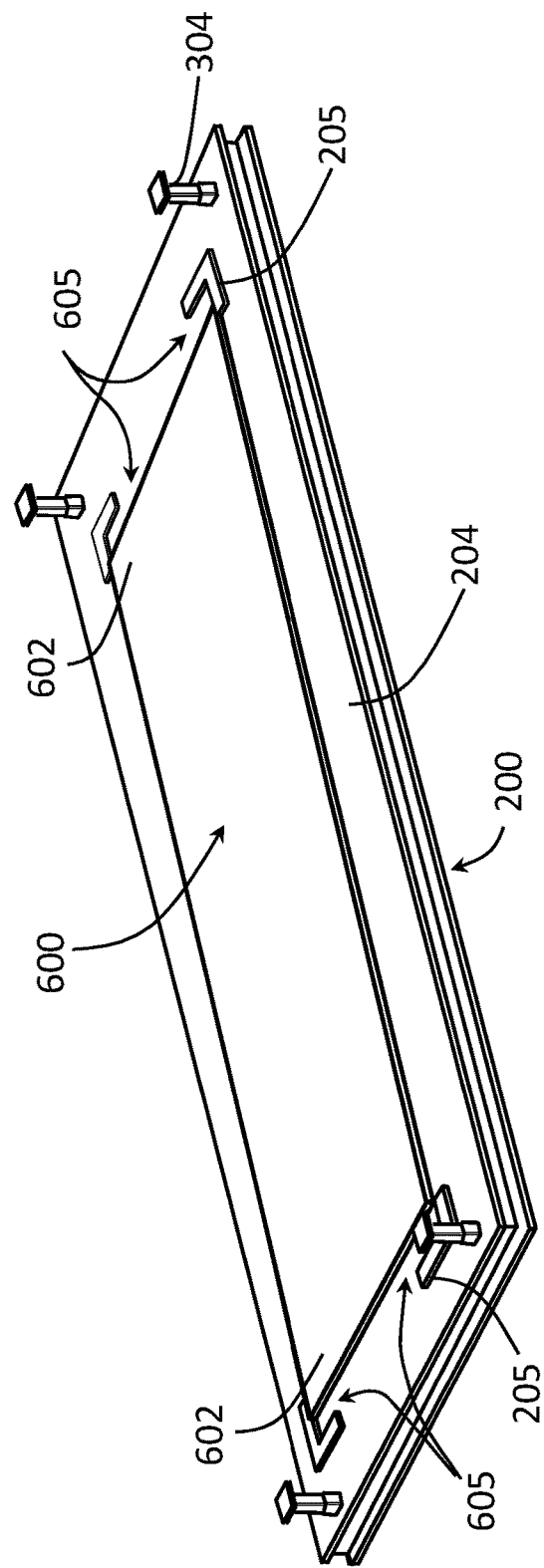
FIG. 31 shows an embodiment where a sealing sheet or plate is fixed onto an upper surface of a shelf of a multi-panel consolidation device.
Figure 32:
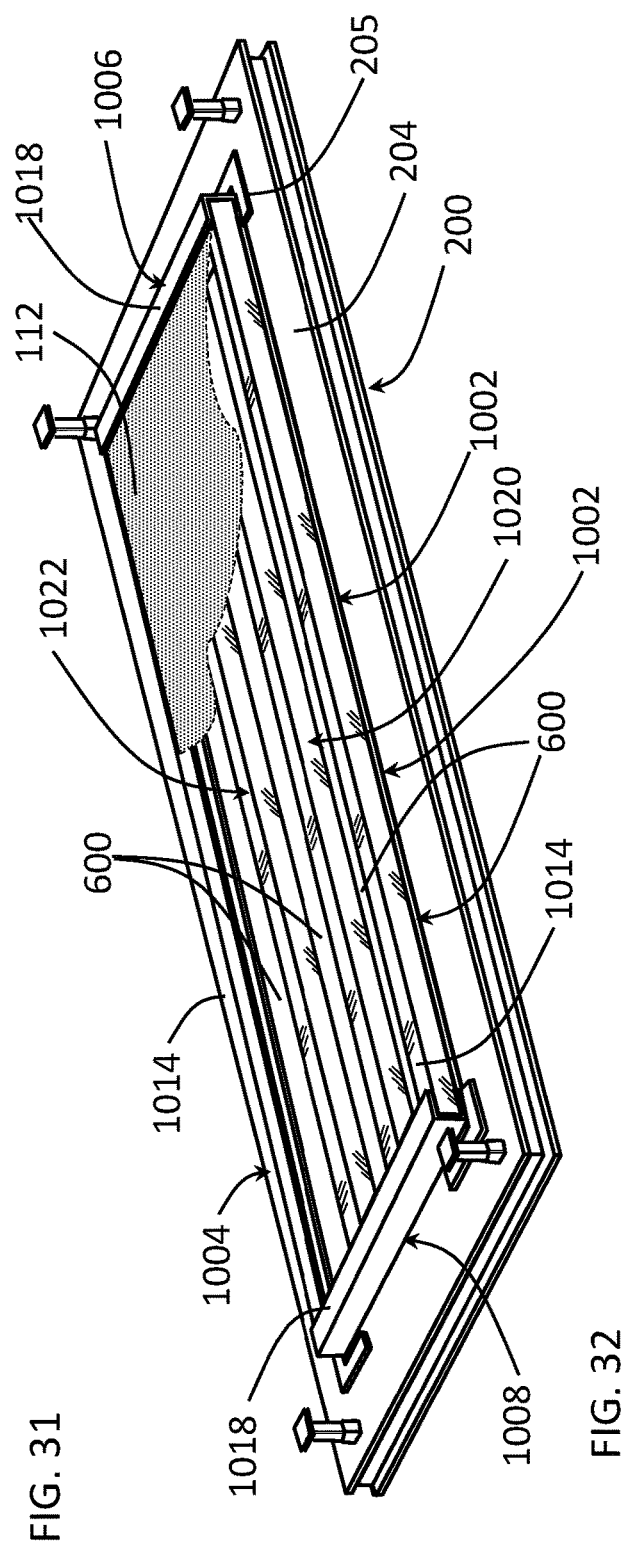
FIG. 32 shows the building panel positioned and placed on the upper surface of the shelf, against the sealing sheet or plate.

In another embodiment of the invention, a sealing member can be used and placed against the outer faces of the frame of the building panel, during the injection of the expandable foam into the cavities of the frame, to provide improved sealing of the outer frame surface. In an embodiment of the invention, illustrated in FIGS. 28-32, the building panel 1000 includes a frame that comprises a top exterior track 1006, a bottom exterior track 1008, and opposed first and second side exterior studs 1002 and 1004, which define a frame periphery. The top exterior track 1006 and the bottom exterior track 1008 each are generally U-shaped and define a U-shaped cavity oriented toward the interior of the frame. Each exterior track 1006,1008 has a base, and opposed sidewalls 1018 extending from the base to a distal edge 1019. The building panel 1000 can also include other side interior studs, illustrated as studs 1020 and 1022, and optional other interior stud members as described herein. The frame is configured and constructed so that the opposed ends of the opposed first and second side exterior studs 1002 and 1004, as well as the optional interior studs 1020 and 1022, reside and are captured between the opposed sidewalls 1018, within the U-shaped cavity, of the respective top and bottom exterior tracks 1006,1008, as shown in FIGS. 28 and 29.

When the front surface 1068 and rear surface 1066 of a frame 1000 (see FIG. 22) are placed between and against the confronting upper surface 204 and lower surface 186 of two adjacent shelves 200, the opposed sidewalls 1018 of both the top and bottom external tracks 1006,1008 lay flush against the respective upper and lower surfaces 204,186, while the opposed side walls 1014 and 1015 of the first and second side exterior studs 1002,1004 are spaced uniformly from the respective upper and lower shelf surfaces 204,186 by a gap 1029 that is the thickness 1029 of the track sidewalls 1018. See FIG. 29. The front and rear surfaces 1091,1093 of the interior studs 1020,1022 are spaced similarly from the respective upper and lower surfaces 204,186 by a gap G of the same thickness 1029. To limit or prevent leakage of the expanding foam through the gaps G, a sealing sheet or plate 600,601 is placed over the respective front surface 1068 and rear surface 1066 of the frame 1000, and is sized to extend the lateral width of the frame 1000, including to at least cover the side walls 1014 and 1015 of the first and second side exterior studs 1002,1004, and the space between, and to extend from inside the distal edge 1019 of the top exterior track 1006 to inside the distal edge 1019 of the bottom exterior track 1008, as illustrated in FIGS. 28 and 29.

In one embodiment of the invention, a first sealing plate 600 and a second sealing plate 601 can be placed against the respective front and rear surfaces 1068,1066 of the frame 1000, and held in place temporarily until the frame 1000 with the held-in-place sealing plates 600,601 is placed between the confronting surfaces of two adjacent shelves 200. Injection of the expandable foam, described herein, is contained within the interior cavities of the frame 1000, confined by the opposed sealing plates 600,601. The resulting outer foam surfaces of the finished building panel are formed against the sealing plates 600,601, and are flush with the side walls 1014,1015 of the first and second side exterior studs 1002,1004.

In another embodiment of the invention, a first sealing plate 600 is fixed, either temporarily or permanently, against the upper surface 204 of a shelf 200. Panel positioning members 205 can be used to aid positioning of a frame 1000 on the surface 204, so that the sidewalls 1018 of the top and bottom exterior tracks 1006,1008 outside the opposed ends 602 of the first sealing plate 600. Although not separately illustrated, a second sealing plate 601 is fixed, either temporarily or permanently, to the lower surface of a second confronting shelf. When the second shelf is placing over and in contact with the peripheral frame surface to close the front opening of the frame, the opposite sidewalls 1018 of the top and bottom exterior tracks 1006,1008 register in the gaps 605 outside the opposed ends 602 of the second sealing plate 601.

The use of the sealing plate or sheet 600 provides an improved aesthetic appearance of the panel, by preventing excessive leakage of the expanding foam material. In addition, the sealing plate avoids the need to apply excessive force to achieve a good seal for the frame and its members, and particularly of the top and bottom exterior tracks 1006, 1008, as is described above when the compressive force can crush and deform, for example, a track having a thickness T that is greater than the thickness S of the internal and external studs of the frames.

In an embodiment of the invention, the sealing plate or sheet 600 can be made of a rigid material, selected form the group consisting of steel, galvanized steel, other metal or alloy, of can be made of a resilient material, such as natural or synthetic rubber or elastomer, synthetic polymer, or resin. In another embodiment, the sealing plate or sheet can thin sheet of a natural or synthetic rubber or elastomer, to improve the seal between the sealing plate or sheet 60 and the opposed side walls 1014 and 1015 of the first and second side exterior studs 1002,1004.

When the shelves 200 are in the expanded configuration, either one, or a plurality of frames of building panels can be positioned on the multi-panel consolidation device 20, for injection of an expandable polymer into the cavities defined by the frames, to form an expanded foam in each of the cavities. The expanded foam, when fully cured and stabilized, forms a light-density closed-cell structure that is semi-rigid. A typical density of the foam can range from about 2.0 lbs/ft$^3$ to about 3.0 lbs/ft$^3$. For example, one of the frames 1000 of building panels 1099 can be placed on the base 150, and/or one of the frames 1000 can be placed on one or more of the shelves 200, of the multi-panel consolidation device 20, for injection of the expandable polymer into each of the cavities defined by each of the frames 1000. In one embodiment, the frame 1000 can define cavities 1040, 1042, 1044, 1046, 1048, 1052, 1054 and 1056. The cavity 1040 can be defined by the top exterior track 1006, the bottom exterior track 1008, the first side exterior stud 1002, and the first side interior stud 1020. The cavity 1042 can be defined by the top exterior track 1006, the top interior track 1024, the first side interior stud 1020, and one of the connecting members 1028. The cavity 1044 can be defined by the top exterior track 1006, the top interior track 1024, and two of the connecting members 1028. The cavity 1046 can be defined by the top exterior track 1006, the top interior track 1024, the second side interior stud 1022 and one of the connecting members 1028. The cavity 1048 can be defined by the top exterior track 1006, the bottom exterior track 1008, the second side exterior stud 1004, and the second side interior stud 1022. The cavity 1052 can be defined by the bottom exterior track 1008, the bottom interior track 1026, the first side interior stud 1020 and one of the connecting members 1030. Cavity 1054 can be defined by the bottom exterior track 1008, the bottom interior track 1026, and two of the connecting members 1030. The cavity 1056 can be defined by the bottom exterior track 1008, the bottom interior track 1026, one of the connecting members 1030 and the second side interior stud 1022.

The top exterior track 1006 of the frame 1000 can define a plurality of injection apertures 1007. Each of the cavities 1042, 1044 and 1046 can be in fluid communication with one of the injection apertures 1007. The bottom exterior track 1008 of frame 1000 can define a plurality of injection apertures 1009. Each of the cavities 1040, 1052, 1054, 1056 and 1048, can be in fluid communication with one of the injection apertures 1009. The top exterior track 1006, the second side exterior stud 1004, the bottom exterior track 1008 and the first side exterior stud 1002 can form a periphery of the frame 1000. The frame 1000 can define an opening 1060, which can receive a window pane (not shown).

Other frames, e.g., additional frames 1000, and/or any combination of frames having different configurations, e.g., frames 2000, 3000, 4000, 5000, 6000 and 7000, can be positioned on the multi-panel consolidation device 20 at the same time so that the base 150 and/or one or more of the shelves 200 of the multi-panel consolidation device 20 support one of the frames. In the illustrated embodiment, the multi-panel consolidation device 20 includes four of the shelves 200, and five frames of building panels can be supported by the multi-panel consolidation device 20, as shown in FIGS. 28-30. In other embodiments, the multi-panel consolidation device 20 can include different numbers of shelves, and can therefore support different numbers of building panels. Each frame of a building panel, (e.g., frame 1000 of building panel 1099) can be positioned on the multi-panel consolidation device 20 so that the injection apertures, (e.g., injection apertures 1009 defined by frame 1000) are accessible to an operator. For example, as shown in FIGS. 14 and 15, the injection apertures 1009 defined by the bottom exterior track 1008 frame 1000 can be accessible through one end of the multi-panel consolidation device 20, between two of the posts 152.

After a frame, or multiple frames, e.g., five of the frames 1000, have been positioned on the multi-panel consolidation device 20, the hydraulic system 280 can be used to force the upper structure 180 and the shelves 200 downwardly. The configuration of the link assemblies 210 can permit the shelves 200 to move vertically downwardly from the expanded configuration to the collapsed configuration. This can result in the application of a downwardly acting force, or a compressive force, to each of the frames (e.g., frame 1000 of building panel 1099), when the shelves 200 are in the collapsed configuration, which can limit expansion of an expandable polymer inject into the cavities defined by the frame. In one embodiment, the second compressive force exerted by the shelves 200 on the front surface of the frame resists expansion by the expandable polymer, and the expanded foam does not extend outside of the cavity beyond a plane of the front surface and a plane of the rear surface of the frame.

When the piston rods 320 of the hydraulic cylinders 310 are extended, the upper structure 180 and each of the shelves 200 can move downwardly together until the lower surface 202 of the lowermost one of the shelves 200, i.e., shelf 200d, contacts the contact surfaces 354 of the spacers 340e and the frame of the building panel positioned on the base 150. When this occurs, the downward movement of shelf 200d link 252e can stop. The upper structure 180 and the shelves 200a, 200b and 200c can then move downwardly together, as a result of further extension of the piston rods 320, until the lower surface 202 of shelf 200c contacts the contact surfaces 354 of the spacers 340d and the frame of the building panel positioned on the shelf 200d. This process can continue until the shelves 200 are in the collapsed configuration and a compressive force is applied to each of the frames of the building panels, with upper structure 180 and the respective shelves 200 in direct contact with each of the top surfaces and bottom surfaces of the frames. The frame positioned on the shelf 200a can be "sandwiched between" and constrained by the upper structure 180 and the shelf 200a. The frame positioned on the shelf 200b can be constrained by the shelf 200a and the shelf 200b. The frame positioned on the shelf 200c can be constrained by the shelf 200b and the shelf 200c. The frame positioned on the shelf 200d can be constrained by the shelf 200c and the shelf 200d. The frame positioned on the base 150 can be constrained by the shelf 200d and the base 150.

The configuration of the link assemblies 210 can also allow the shelves 200 to move upwardly from the collapsed configuration to the expanded configuration. When an operator wishes to move the shelves 200 from the collapsed configuration to the expanded configuration, the operator can position the switch 294 on the operator console 288 to the up position. This can cause the piston rods 320 of each of the hydraulic cylinders 310 to retract, or move upwardly. Due to the connection of the piston rods 320 with the upper structure 180, the retraction of the piston rods 320 can cause the upper structure 180 to move upwardly. Due to the connection of the upper structure 180 with the upper link 252a of each of the link assemblies 210, the upper link 252a of each link assembly 210 can also move upwardly. When the bottom of the slot 256 defined by the link 252a contacts the elongate member 226 (for forward ones of the link assemblies 210), or contacts the elongate member 228 (for rearward ones of the link assemblies 210) of shelf 200a, the shelf 200a can move upwardly. When the bottom of the slot 256 defined by the link 252b contacts the elongate member 226 (for forward ones of the link assemblies) or the elongate member 228 (for rearward ones of the link assemblies 210) of shelf 200b, shelf 200b can move upwardly. This process can continue until the shelves 200 are in the expanded, or raised, configuration.

The foam supply system 18 is illustrated schematically in FIG. 18. The foam supply system 18 can supply a monomer and a catalyst, in the form of fluids, which can mix and react to form an expandable polymer, for use in filling the cavities defined by the frames of building panels, e.g., the cavities defined by the frame 1000 of building panel 1099. An expanded foam, e.g., foam 500 can be formed from the expandable polymer. In one embodiment, the expandable polymer can be polyurethane. The foam supply system 18 can include a first container 400, which can contain a monomer, and a second container 402, which can contain a catalyst. Each of the monomer and the catalyst can be in a liquid or solution state. A portion of the foam supply system 18 can be disposed in the temperature-controlled room 22 in order to maintain the monomer within the first container 400 and the catalyst within the second container 402, at the desired temperature.

A pressurized inert gas, e.g., pressurized nitrogen, can be supplied to each of the containers 400 and 402 to force the monomer and the catalyst out of the containers 400 and 402, respectively, when desired. In one embodiment, the system 18 can include a container 404, which can contain the pressurized inert gas. System 18 can include a shutoff valve 408, which can be opened and closed by an operator. When the shutoff valve 408 is open, the pressurized inert gas can flow out of the container 404, through a conduit 406 and a conduit 410 to a connector 412, and then through each of the conduits 414 and 420. The foam supply system 18 can also include shutoff valves 416 and 422. When the shutoff valve 416 is open, pressurized inert gas can flow through the conduit 414, through the shutoff valve 416 and through a conduit 418 into an interior chamber defined by the container 400, which can pressurize the monomer within the interior chamber. Similarly, when the shutoff valve 422 is open, the pressurized inert gas can flow through the conduit 420, shutoff valve 422 and a conduit 424 into an interior chamber defined by the container 402, which can pressurize the catalyst within the interior chamber.

The foam supply system 18 can include a conduit 430, a modulating valve 432, a conduit 434, and a heater 436. The conduit 430 can establish fluid communication between the interior chamber defined by the container 400, and the modulating valve 432. The conduit 434 can establish fluid communication between the modulating valve 432 and the heater 436. The monomer that discharges from the container 400 can flow through the conduit 430, the modulating valve 432, the conduit 434 and heater 436 into a conduit 438. The modulating valve 432 can control the flow rate of the monomer that discharges from the container 400, and the heater 436 can heat the monomer to a desired temperature.

The foam supply system 18 can also include a conduit 450, a modulating valve 452, a conduit 454 and a heater 456. The conduit 450 can establish fluid communication between the interior chamber defined by the container 402 and the modulating valve 452. The conduit 454 can establish fluid communication between the modulating valve 452 and the heater 456. The catalyst that discharges from the container 402 can flow through the conduit 450, the modulating valve 452, the conduit 454, and the heater 456 into a conduit 458. The modulating valve 452 can control the flow rate of the catalyst that discharges from the container 402, and the heater 456 can heat the catalyst to a desired temperature.

The foam supply system 18 can include a spray gun 470, which can include a spray bar 472. The conduit 438 can establish fluid communication between the heater 436 and the spray gun 470. Accordingly, the monomer discharging from the heater 436 can flow through the conduit 438 to the spray gun 470. The conduit 458 can establish fluid communication between the heater 456 and the spray gun 470. Accordingly, the catalyst discharging from the heater 456 can flow through the conduit 458 to the spray gun 470, where it can mix with the monomer, resulting in an expandable polymer, e.g., an expandable polyurethane, within the spray gun 470. The expandable polymer can be in a liquid state as it discharges from the spray gun 470 into the cavities defined by a frame of a building panel. The foam supply system 18 can also include a flexible electrical member 482, e.g., a cable, which can be used to transmit data from a computer 480 to the spray gun 470. The foam supply system 18 can include a source of pressurized air (not shown) and a shutoff valve (not shown), which can permit pressurized air to be selectively supplied through a conduit 490 to the spray gun 470.

Figure 19:
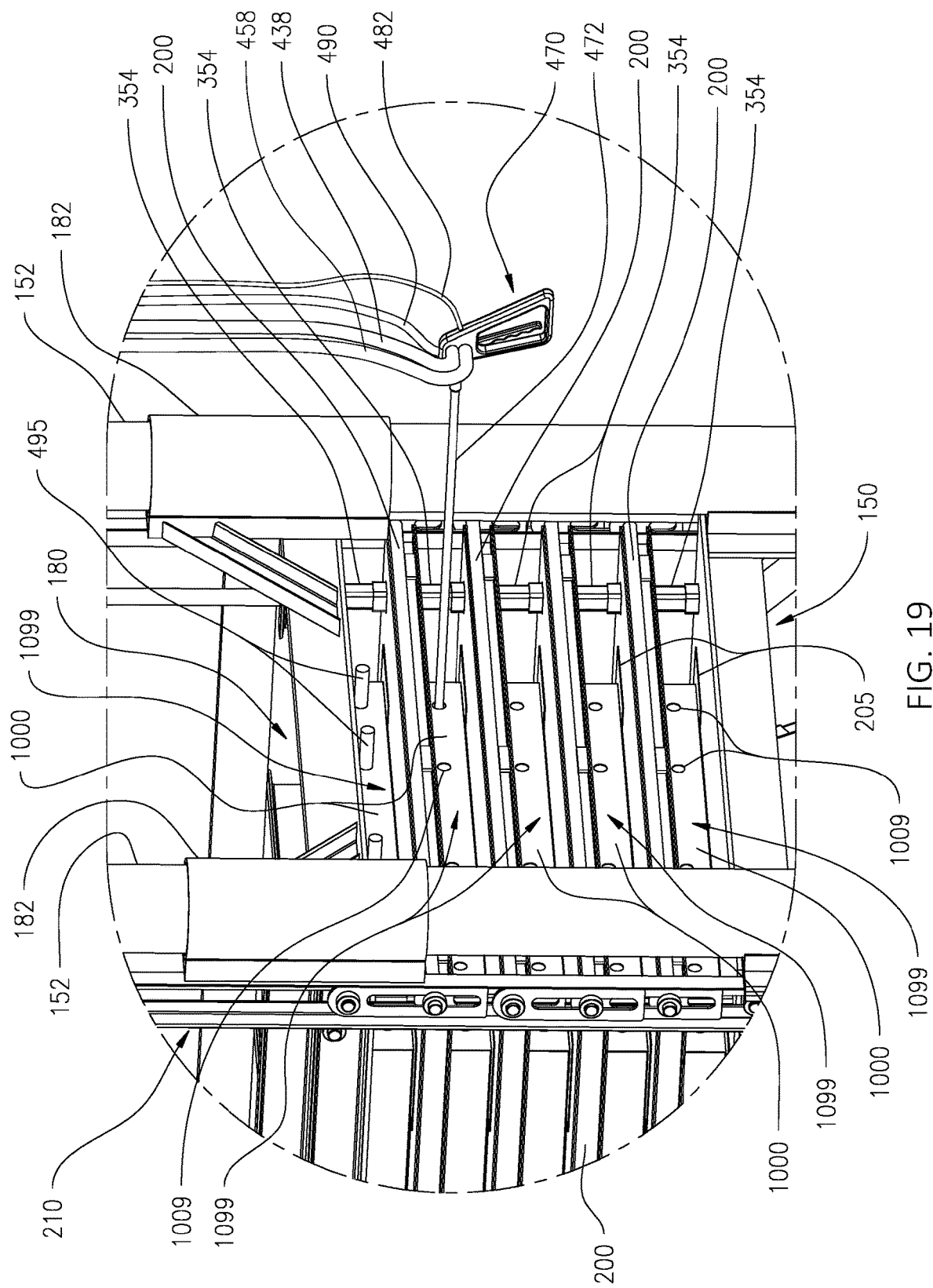
FIG. 19 is a perspective view of a portion of the multi-panel consolidation device and the building panels depicted in FIG. 16, with the shelves of the multi-panel consolidation device in the collapsed configuration, and depicting a spray bar of the foam system depicted in FIG. 18, inserted through an injection aperture defined by one of the building panels into a cavity (not shown) defined by the building panel.

An operator can selectively inject the expandable polymer with the spray gun 470 into each of the cavities of building panels disposed on the multi-panel consolidation device 20. For example, as shown in FIG. 19, an operator can insert the spray bar 472 of spray gun 470 through one of the apertures 1009 defined by the frame 1000 of building panel 1099, into the cavity 1048 defined by the frame 1000. Each of the conduits 438, 458 and 490, as well as the electrical member 482 can be flexible, which can permit an operator to inject the expandable polymer into injection apertures, e.g., 1009 and 1007, positioned adjacent to opposite ends of the multi-panel consolidation device 20, without removing the frame 1000 from the multi-panel consolidation device 20. An operator can periodically and selectively clean the spray bar 472 with pressurized air supplied from the conduit 490.

The cavities defined by the frames 1000, 2000, 3000, 4000, 5000, 6000 and 7000, can be open-faced cavities as shown in FIGS. 20 and 22 for the cavities defined by frame 1000. However, the cavities can be closed, or at least substantially closed during the process of injecting an expandable polymer into the cavities. For example, the fabric 112 can enclose the cavities defined by the frame, when the fabric 112 is a non-woven material. When the fabric 112 is a woven material, the cavities can be substantially enclosed due to the porosity of the fabric 112, i.e., the fabric 112 can be porous or micro-porous. In those embodiments where the building panels do not include fabric 112, the cavities defined by frames of the building panels can be enclosed by a pair of plastic sheets. One of the plastic sheets can enclose a front surface of the frame, and the other plastic sheet can enclose a rear surface of the frame. Cellophane can be wrapped around the frame and the plastic sheets. The plastic sheets and the cellophane can be removed after the expanded foam within the cavities has cured. A fluid can be applied to the surfaces of the plastic sheets to facilitate removing them. A fluid can be selected that does not adhere to the foam (e.g., foam 500) within the cavities defined by the frame, and which does not adversely affect either the foam or the plastic sheets.

As the expandable polymer is injected into a cavity defined by a frame of a building panel, e.g., cavity 1048, to deliver a mass of expandable polymer that expands within the cavity into an expanded foam, e.g., the foam 500. The operator can inject the expandable polymer into a cavity defined by building panel, e.g., the cavity 1048, for a predetermined period of time and at a predetermined injection rate to obtain the desired mass of expandable polymer for the cavity. The computer 480 can be programmed to transmit the desired period of time to the spray gun 470, for each of the cavities defined by the frame of one of the building panels. The desired period of time can be calculated for each of the cavities based on the volumes of the cavities, the desired density of the expanded foam 500, and the injection rate of the expandable polymer. For example, referring to FIG. 22, the volume of the cavity 1054 can be larger than the volume of the cavity 1056, and accordingly, the expandable polymer can be injected into the cavity 1054 for a longer period of time, as compared to the length of time the expandable polymer is injected into the cavity 1056. Calculating the period of time to inject the expandable polymer into each of the cavities can prevent, or at least substantially prevent, "over filling" or "under filling" the cavities with the expandable polymer, and provide better control of the density of the expanded foam.

The expandable polymer injected into the cavities defined by a frame of a building panel (e.g., cavities 1040, 1042, 1044, 1046 and 1048 defined by the frame 1000 of building panel 1099), can expand as a foam during the time that it is curing into an expanded foam, e.g., foam 500, and while expanding can exert a substantial force on the respective ones of the upper structure 180, shelves 200 and base 150. However, downward acting, compressive forces applied to the upper structure 180 by the hydraulic cylinders 310, can counteract and overwhelm the force caused by expansion of the foam 500 and can prevent the foam 500 from expanding beyond the front and rear surfaces of the tracks and studs of the frame 1000, which can therefore enhance the quality of the building panel 1099. In one embodiment, each of the hydraulic cylinders 310 can develop 4712 lbs. of extend thrust, i.e. when the piston rods 320 are being extended, at 1500 psi. The retract thrust of each of the hydraulic cylinders, i.e. the thrust developed when the piston rods 320 are being retracted, can be 2869 lbs. of thrust.

The foam 500 can include a foam structure, which can include a plurality of foam sub-structures, which are designated 500*a*, 500*b*, 500*c*, 500*d*, 500*e*, 500*f*, 500*g* and 500*h*, as shown in FIG. 24, which can be disposed within cavities 1040, 1042, 1044, 1046, 1048, 1052, 1054 and 1056, respectively. As illustrated in FIGS. 24, 25 and 26, with respect to the foam sub-structure 500c, each of the foam substructures can include a front face, e.g., 1086, a back face, e.g., 1088, and a peripheral edge, e.g., 1085 (FIG. 24). Each foam sub-structure, e.g., 500c, can be confined on its peripheral edge, e.g., 1085, by the frame 1000. Each of the foam sub-structures, e.g., 500c, can have a foam thickness F, from the back face 1088 to the front face 1086. Each of the studs of the frame 1000, e.g., the upper interior connecting members 1028, can have a front surface 1091, a rear surface 1093 and a stud thickness S from the rear surface 1093 to the front surface 1091. Applying a compressive force to the frames of building panels, e.g., frame 1000 of building panel 1099, during the process of injecting an expandable polymer into the cavities defined by the frame, can constrain the expansion of the expandable polymer. Application of the compressive force coupled with injecting the expandable polymer for a predetermined period of time, determined at least in part by the volume of each of the cavities, can effect a relatively small variation in the foam thickness F within any of the cavities individually and among all of the cavities defined by the frame, e.g., frame 1000. For those building panels including fabric 112 that at least partially encloses the cavities, the fabric 112 can also facilitate limiting the expansion of the expandable polymer during the curing process. The expandable polymer can permeate the fabric 112, which can have a relatively small thickness, to facilitate forming an integrated construction of the building panel, e.g. 1099.

The foam thickness F can be defined as the stud thickness S with a tolerance having an absolute value of less than 2 mm (0.079 inches), including less than 1 mm (0.039 inches) and including less than 0.5 mm (0.02 inches). In one embodiment, the foam thickness F can have a value, or magnitude ranging from about S plus 0.0625 inches (1.6 mm) to about S minus 0.0625 inches (1.6 mm).

During the expanding and curing process, the aperture can be closed, for example, using a plug, e.g., a wooden dowel, to prevent the expandable polymer from "oozing" out of the injection apertures, e.g., 1007 and 1009. After the expandable polymer has cured, forming an expanded foam, e.g., foam 500, the wooden dowels can be removed. After the foam 500 has been formed, the upper structure 180 and the shelves 200 can be raised, such that the shelves 200 are in the expanded configuration, and the building panels 1099 can be removed from the multi-panel consolidation device 20.

The system 10 and associated method can be used to manufacture building panels according to other embodiments. For example, system 10 can be used to manufacture door panels, solid panels, electrical panels, and gable panels. Examples of a door panel, a solid panel, an electrical panel and a gable panel are illustrated in U.S. Pat. No. 9,732,525.

FIG. 27 illustrates a multi-panel consolidation device 520, according to another embodiment. The multi-panel consolidation device 520 can be wider than the multi-panel consolidation device 20, but can otherwise be the same as, or similar to, the multi-panel consolidation device 20. For example, like the multi-panel consolidation device 20, the multi-panel consolidation device 520 can include the base 150, the upper frame 154, a plurality of the posts 152 that can be attached to each of the base 150 and the upper frame 154, and can extend upwardly from the base 150. The multi-panel consolidation device 520 can also include the upper structure 180, which can be movably coupled with the posts 152, and a plurality of the shelves 200, which can be vertically spaced and disposed vertically between the base 150 and the upper structure 180. Like the multi-panel consolidation device 20, the multi-panel consolidation 520 can include a plurality of the link assemblies 210, and the shelves 200 can be connected to the upper structure 180 and can be interconnected with one another, with the link assemblies 210. The shelves 200 can be movable vertically between an expanded configuration (FIG. 27) and a collapsed configuration (not shown). A plurality of the spacers 340 can be connected to each one of the shelves 200. The multi-panel consolidation device 520 can also include the hydraulic system 280, which is shown schematically in FIG. 17, and which includes a plurality of the hydraulic cylinders 310, as shown in FIG. 27. The hydraulic cylinders 310 can be coupled with the upper structure 180, and can provide the motive force to move the upper structure 180 and the shelves 200 downwardly and upwardly. The hydraulic system 280 can include an operator console 288, which permits an operation to selectively move the upper structure 180 and the shelves 200 upwardly and downwardly.

The shelves 200 of the multi-panel consolidation device 20 can be 4 feet (about 1.22 m) wide, or about 4 feet wide, as measured between the first side member 218 and the second side member 220 of each of the shelves 200. In contrast, the shelves 200 of the multi-panel consolidation device 520 can be 8 feet wide (about 2.44 m), or about 8 feet wide, as measured between the first side member 218 and the second side member 220 of each of the shelves 200. Similarly, the base 150 of the multi-panel consolidation device 520 can be 8 feet (about 2.44 m) wide or about 8 feet wide. Accordingly, wider frames of building panels can be positioned on the base 150 and/or the shelves 200 of the multi-panel consolidation device 520, as compared to the size of the frames of building panels that can be positioned on the base 150 and/or on shelves 200 of the multi-panel consolidation device 20. For example, the frames of double window panels and the frames of double door panels, for example French doors or sliding doors, can be positioned on the shelves 200 of the multi-panel consolidation device 520. Also, two smaller building panels, which can each be 4 feet (about 1.22 m) wide, for example, can be positioned side-by-side on the base 150 or on one of the shelves 200 of the multi-panel consolidation device 520. Each of the multi-panel consolidation device 20 and the multi-panel consolidation device 520 can accommodate frames of various lengths, for example, frames that are 8 feet (about 2.44 m), 9 feet (about 2.74 m) or 10 feet long (about 3.05 m). In other embodiments, the shelves 200 of either one of the multi-panel consolidation devices 20 and 520 can include shelves having different widths and lengths.

The use of system 10 and the associated method for manufacturing building panels, which can be used in residential and commercial structures, can result in various advantages that can include: the production of modular building panels which can be connected to one another in a variety of arrangements; the production of building panels having above, or greater than, industry-standard insulation characteristics, as well as fire-retardant characteristics, due to the metal frames of the building panels and the foam within cavities defined by the frames; enhanced quality control of the building panels relative to conventional foam-filled building panels, e.g., a reduced dimensional tolerance of a thickness of the foam within the cavities defined by an individual frame of a building panel, and a reduced panel-to-panel dimensional variation of the thickness of the foam (e.g., 500); cost effective production of the building panels; and increased rate of production of the building panels.

The modular nature of the building panels provides flexibility in arranging the panels as required at a construction site, to accommodate various floor plans, e.g., floor plans of residential houses, and to assemble the panels in an efficient manner. For example, the building panels to be used for a particular structure can be manufactured with the same thickness of the studs and tracks of the frames, the building panels, and with the same length of the exterior studs that form a portion of a periphery of the frames of the building panels so that the building panels can be positioned adjacent one another. For example, a window panel can be positioned adjacent to a door panel, and either one of the window panel and the door panel can be positioned adjacent to a solid panel. As another example, a gable panel can be positioned adjacent to each of adjacent other gable panels, e.g., which can be arranged to produce gable assemblies.

The foam disposed within the cavities of the building frames can provide above industry-standard insulation R-values, as well as fire retardant characteristics, which can be advantageous relative to homes constructed with wooden frames, for example. Expansion of an expandable polymer, to form an expanded foam, during the curing process, and can result in a significant force being exerted on a structure surrounding the foam. The use of a multi-panel consolidation device to constrain the building panels during the process of filling the cavities with foam can counteract the force exerted by the expandable polymer during expansion and can permit a reduced dimensional tolerance, relative to a nominal value, of a foam thickness, e.g., F. of the expanded foam. A base and each one of a plurality of shelves of a multi-panel consolidation device can support one or more building panels during the process of filling the cavities defined by the frames of the building panels with foam. The building panels can be positioned on the base or one of the shelves of the multi-panel consolidation device when the shelves are in an expanded configuration. After the building panels have been positioned on either the base or one of the shelves, the shelves can be forced downwardly by a plurality of hydraulic cylinders of a hydraulic system to a collapsed configuration of the shelves. Use of the multi-panel consolidation device can enhance the rate of production of building panels, as an operator can start injecting an expandable polymer into one or more additional cavities while the expandable polymer within the first cavity is curing, i.e., forming an expanded foam.

Also, injecting an expandable polymer into each cavity for a predetermined period of time, can prevent, or at least substantially prevent, "over-filling" or "under-filling the cavities with the expandable polymer. The building panels (e.g., 1099) can be manufactured with a reduced variation, or tolerance, of the thickness of the foam (e.g., 500), for each building panel (e.g., 1099), and a reduced variation in the thickness of the foam (e.g., 500) from panel-to-panel, relative to conventional foam-filled building panels. This can result in a more consistent insulation R-value throughout the panel, as compared to conventional foam-filled panels, and can provide a uniform, smooth surface for the application of interior dry wall or exterior finishes. In contrast some conventional panels exhibit a bulge which at least inhibits proper application of dry wall or exterior finishes.

The multi-panel consolidation device (e.g., 20, 520) can accommodate a plurality of building panels, which can be the same or can be a mixture of different building panels. The cavities of each of the building panels can be filled with foam, without raising the shelves to an expanded configuration and removing the building panels. This enhances the rate of production of manufacturing building panels. Also, when the expandable polymer, which forms a foam, e.g., foam 500, that has been injected into one of the cavities (e.g., 1040) defined by the frame (e.g., 1000) of the building panel (e.g., 1099) is curing, an expandable polymer can be injected into another cavity (e.g., 1042), which can also enhance the rate of production of manufacturing building panels. The spacers (e.g., 340) can be releasably attached to either the base (e.g., 150) or one of the shelves (e.g., 200) of the multi-panel consolidation device, and sets of spacers (e.g., 340) can be provided that have different heights (e.g., 356), and each height can correspond with a standard thickness of the studs of a frame of a building panel. This can reduce the time required to reconfigure the multi-panel consolidation device (e.g., 20, 520) to receive building panels having different configurations.

The use of panel positioning members (e.g., 205) can enhance the rate of production by facilitating positioning the frames (e.g., 1000) on a multi-panel consolidation device (e.g., 20). The rate of producing the building panels (e.g., 1099) can also be enhanced, or increased, as a result of the following: the open configuration of the panel frame assembly fixture 12, which permits a welder to reach in through the open space to weld a back side of a joint between a stud and a track of a building frame; the ability to produce studs and tracks that are perpendicular to one another due to the configuration of the first and second side frames of the panel frame assembly fixture (e.g., 12); the use of trolleys (e.g., 64) to conveniently position a welding machine, e.g., a spot welder; and the ability of a multi-panel consolidation device (e.g., 20, 520) to support building panels having different lengths and/or widths.

While various embodiments of a method and apparatus for manufacturing building panels have been illustrated by the foregoing description and have been described in considerable detail, it is not intended to restrict or in any way limit the scope of the appended claims to such detail. Additional advantages and modifications will be readily apparent to those skilled in the art.

What is claimed is:

1. A method for making a foam-filled building panel, comprising:
   i) providing a frame having a periphery that includes a front peripheral frame surface and a rear peripheral frame surface, the frame defining a cavity, the front frame surface defining a front opening and the rear frame surface defining a rear opening, where the frame has a thickness defined between the front peripheral frame surface and the rear peripheral frame surface;
   ii) providing a top planar shelf having a lower surface, and a bottom planar shelf having an upper surface;
   iii) providing a plurality of spacers, each having an upper surface and a lower surface, and a height defined between the upper surface and the lower surface, and placing the lower surfaces of the plurality of spacers against the upper surface of the bottom planar shelf at spaced-apart positions, where the heights of the plurality of spacers are the same as the thickness of the frame;
   iv) placing the lower surface of the top planar shelf over and in contact with the front peripheral frame surface to close completely the front opening, and the upper surface of the bottom planar shelf over and in contact with the rear peripheral frame surface to close completely the rear frame opening;
   v) applying a first force against the top planar shelf and a second force against the bottom planar shelf;
   vi) injecting an amount of an expandable polymer through an aperture in the frame into the cavity, and closing the aperture;

vii) maintaining the applied forces for a time sufficient for the expandable polymer to expand and fill the cavity, and to form a stable expanded foam; and viii) releasing the first and second forces and removing the top and bottom planar shelves from the front and rear frame surfaces to form the foam-filled building panel; wherein:

the applied first force and applied second force are sufficient to maintain the top and bottom planar shelves in contact with the front peripheral frame surface and the rear peripheral frame surface of the frame while the expandable polymer is expanding and filling the cavity, the top planar shelf and the bottom planar shelf have a rigidity sufficient to maintain planarity against the applied first and second forces and an expanding force of the expandable polymer, and wherein lower surface of the top planar shelf contacts the upper surfaces of the plurality of spacers, whereby the plurality of spacers define a minimum distance between the top planar shelf and the bottom planar shelf during an application of the applied force to limit crushing of the frame beyond such minimum distance.

2. The method of claim 1, further comprising covering the cavity with a fabric, the fabric comprising at least one of a woven polymeric material and a non-woven polymeric material, and wherein the covering comprises:
a) bonding at least one piece of the fabric to the front frame surface; and
b) bonding at least one piece of the fabric to the rear frame surface.

3. The method of claim 1, wherein the first force and second force are applied by one or more hydraulic cylinders.

4. The method of claim 1, wherein the frame comprises a plurality of studs and a plurality of tracks attached to one another, wherein where the heights of the plurality of spacers are the same as a thickness of at least one of the studs and the tracks.

5. The method of claim 4, wherein the plurality of tracks includes a top exterior track and a bottom exterior track, each being generally U-shaped and defining a U-shaped cavity, the plurality of studs includes a first side exterior stud and a second side exterior stud, wherein a first end of the first side exterior stud and a first end of the second side exterior stud are disposed in the cavity defined by the bottom exterior track, and a second end of the first side exterior stud and a second end of the second side exterior stud are disposed in the cavity defined by the top exterior track.

6. The method of claim 1 wherein the provided top planar shelf, bottom planar shelf, and plurality of spaces comprise a multi-panel consolidation device, which comprises a plurality of shelves, with the shelves being in an expanded configuration.

7. The method of claim 6, wherein the multi-panel consolidation device further comprises an upper structure and a plurality of link assemblies, the method further comprising:
(1) interconnecting the shelves with one another and with the upper structure, with the link assemblies; and
(2) wherein the upper structure and each of the shelves are vertically movable downwardly and upwardly between the expanded configuration and the collapsed configuration.

8. The method of claim 7, wherein:
a) the upper structure, the plurality of shelves and the base of the multi-panel consolidation device cooperate to define a plurality of spaces; and b) the positioning the frame comprises positioning the frame of a building panel on one of the base and the shelf, in a respective one of the spaces.

9. The method of claim 7, wherein the multi-panel consolidation device further comprises a hydraulic system, the hydraulic system comprising a plurality of hydraulic cylinders, each of the hydraulic cylinders comprising a piston and a piston rod attached to the piston, each of the piston rods being coupled with the upper structure, wherein:
a) the forcing the shelves into the collapsed configuration further comprises extending the piston rod of each of the hydraulic cylinders; and
b) the forcing the shelves into the expanded configuration further comprises retracting the piston rod of each of the hydraulic cylinders.

10. The method of claim 1, wherein the injecting further comprises injecting the expandable polymer for a predetermined period of time, the predetermined period of time being determined in part by a volume of the at least one cavity.

11. A building panel comprising: a frame comprising a plurality of studs and a plurality of tracks, the studs and the tracks being attached to one another, the frame having a front surface and a rear surface, and a thickness S from the front surface to the rear surface, the studs and the tracks cooperating to define at least one cavity; and an expanded foam formed from an expandable polymer and disposed within the at least one cavity; wherein the expanded foam comprises a foam structure, the foam structure comprising a front face, a back face and a peripheral edge, the foam structure having a peripheral end and being confined on the peripheral edge by the frame; the foam structure has a foam thickness F defined as the thickness S with a tolerance having an absolute value of less than 2 mm (0.079 inches).

12. The building panel of claim 11, wherein: the studs and the tracks of the frame define a plurality of cavities; the expanded foam comprises a plurality of foam sub-structures, each of the foam sub-structures being disposed within a corresponding one of the plurality of cavities and confined on its peripheral edge by the frame; and each of the foam sub-structures has the foam thickness F.

13. The building panel of claim 12, wherein the fabric comprises a woven polymeric material, the woven polymeric material being porous.

14. The building panel of claim 13, wherein the fabric comprises a non-woven polymeric material.

15. The building panel of claim 12, wherein the foam comprises an expanded polymer resulting from mixing a catalyst with a monomer.

16. The building panel of claim 15, wherein the foam comprises an expanded polyurethane.

17. The building panel of claim 12, wherein: the frame comprises a top exterior track, a bottom exterior track, a first side exterior stud and a second side exterior stud; each of the top exterior track and the bottom exterior track is generally U-shaped and defines a U-shaped cavity;
a first end of the first side exterior stud and a first end of the second side exterior stud are inserted into the U-shaped cavity defined by the bottom exterior track; and a second end of the first side exterior stud and a second end of the second side exterior stud are inserted into the U-shaped cavity defined by the top exterior track.

* * * * *